United States Patent [19]

Gabrlik et al.

[11] Patent Number: 5,447,178

[45] Date of Patent: Sep. 5, 1995

[54] CENTER POSITION BIASED SLIDE AIR VALVE

[75] Inventors: Denny Gabrlik, Seattle; John M. Morris, Auburn, both of Wash.

[73] Assignee: GT Development Corporation, Tukwila, Wash.

[21] Appl. No.: 178,669

[22] Filed: Jan. 7, 1994

[51] Int. Cl.[6] .......................................... F16K 11/065
[52] U.S. Cl. ........................ 137/625.25; 137/353; 251/238; 251/337; 297/284.6; 297/DIG. 3
[58] Field of Search .................. 137/625.25, 353; 251/238, 243, 337; 297/284.6, DIG. 3

[56] References Cited

U.S. PATENT DOCUMENTS

| | | |
|---|---|---|
| 1,839,053 | 12/1931 | Schaded . |
| 1,927,153 | 9/1933 | Conrader ........................ 251/118 |
| 2,591,118 | 4/1952 | Bent . |
| 2,911,006 | 11/1959 | Vogel . |
| 2,942,584 | 6/1960 | Rethmeier . |
| 3,077,207 | 2/1963 | Koutnik . |
| 3,326,601 | 6/1967 | Vanderbilt et al. ............. 297/284.6 |
| 3,338,268 | 8/1967 | Houser et al. .................. 137/625.66 |
| 3,443,592 | 5/1969 | Felmlee ......................... 137/625.11 |
| 3,530,893 | 9/1970 | Masuda .......................... 137/625.25 |
| 3,637,961 | 1/1972 | Fiddler et al. ............ 137/625.48 X |
| 3,959,024 | 5/1976 | Kirk et al. ..................... 137/625.25 |
| 4,144,905 | 3/1979 | Bauer ............................ 137/625.66 |
| 4,292,997 | 10/1981 | Bernat ........................... 137/454.6 |
| 4,524,951 | 6/1985 | Green et al. ................... 251/327 |
| 4,597,414 | 7/1986 | Johnson ......................... 137/625.25 |
| 4,683,914 | 8/1987 | Brisland ........................ 137/625.48 |
| 4,727,766 | 3/1988 | Cummings ...................... 137/353 X |
| 4,727,905 | 3/1988 | Kitamura ....................... 137/625.48 |
| 4,792,186 | 12/1988 | Benjamin et al. .............. 297/284.6 |

FOREIGN PATENT DOCUMENTS

| | | | |
|---|---|---|---|
| 58-53524 | 3/1983 | Japan ............................ 297/DIG. 3 |
| 60-45438 | 3/1985 | Japan ............................ 297/284.6 |

OTHER PUBLICATIONS

Prior design of slide bar and ports (drawing in Information Disclosure Statement).

Primary Examiner—Gerald A. michalsky
Attorney, Agent, or Firm—Delbert J. Barnard

[57] ABSTRACT

The present invention provides an air valve (10) for inflating and deflating an inflatable. The air valve (10) includes a housing floor (16) with air ports (36, 38), and a slide bar (12) with an air passageway (54) formed therein. The slide bar (12) is supported on the floor (16) by seal rings (92) surrounding the ports (36, 38) and is biased into a center position by a spring (94) positioned in a spring well (28) in the slide bar (12) or the floor (16). Pins (50, 52) project into the spring well (28) and engage opposite ends of the spring (94). A stem extends from a tilt button (66) into a socket (48) on the slide bar (12). When the button (66) is tilted, it moves the slide bar (12), compressing the spring (94) and aligning the ports (36, 38) and the passageway (54) to allow air to pass through the valve (10). The slide bar (12) is prevented from tilting by a stabilizer frame (82) or housing shoulders (220). Pressure in the outlet port (38) may be controlled by a metered aperture in the inlet port (36) and bleeding off a portion of flow in the passageway (54).

27 Claims, 11 Drawing Sheets

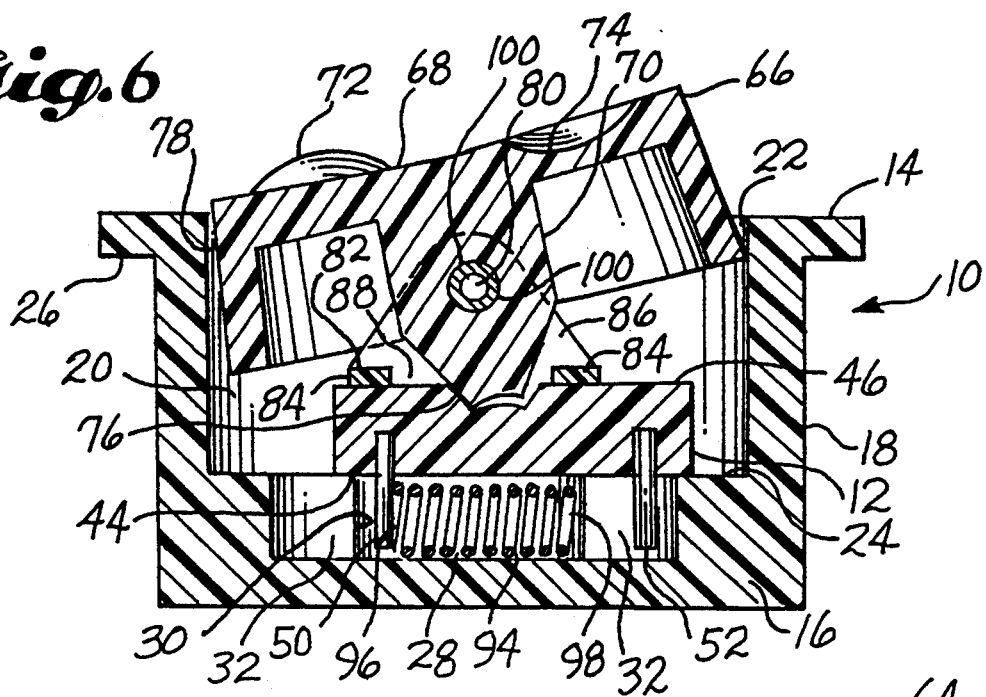
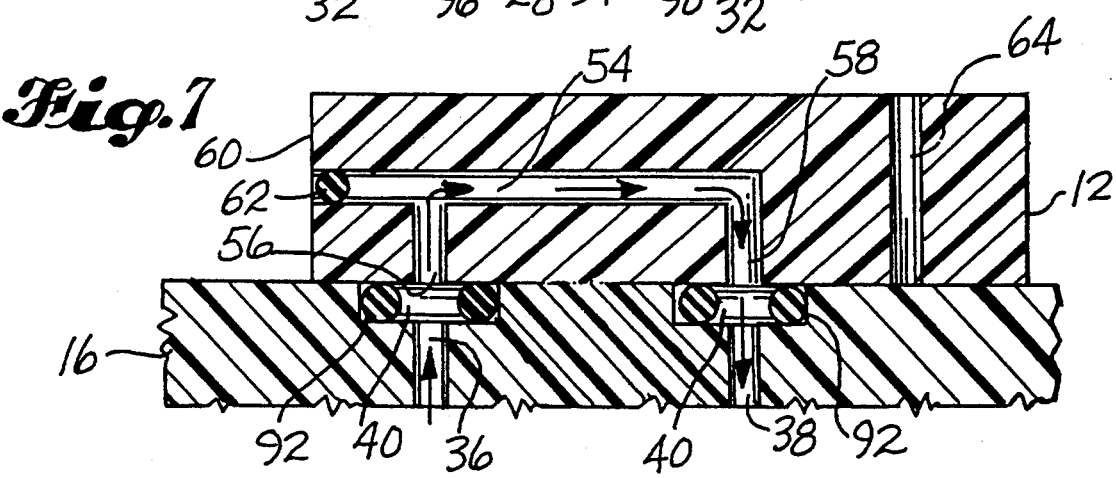
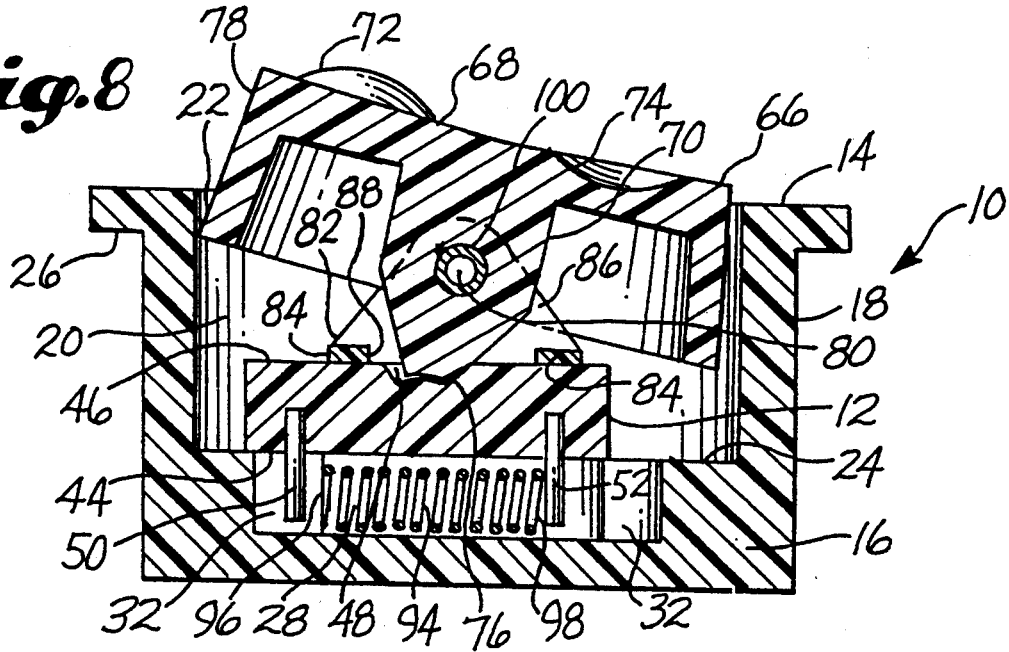

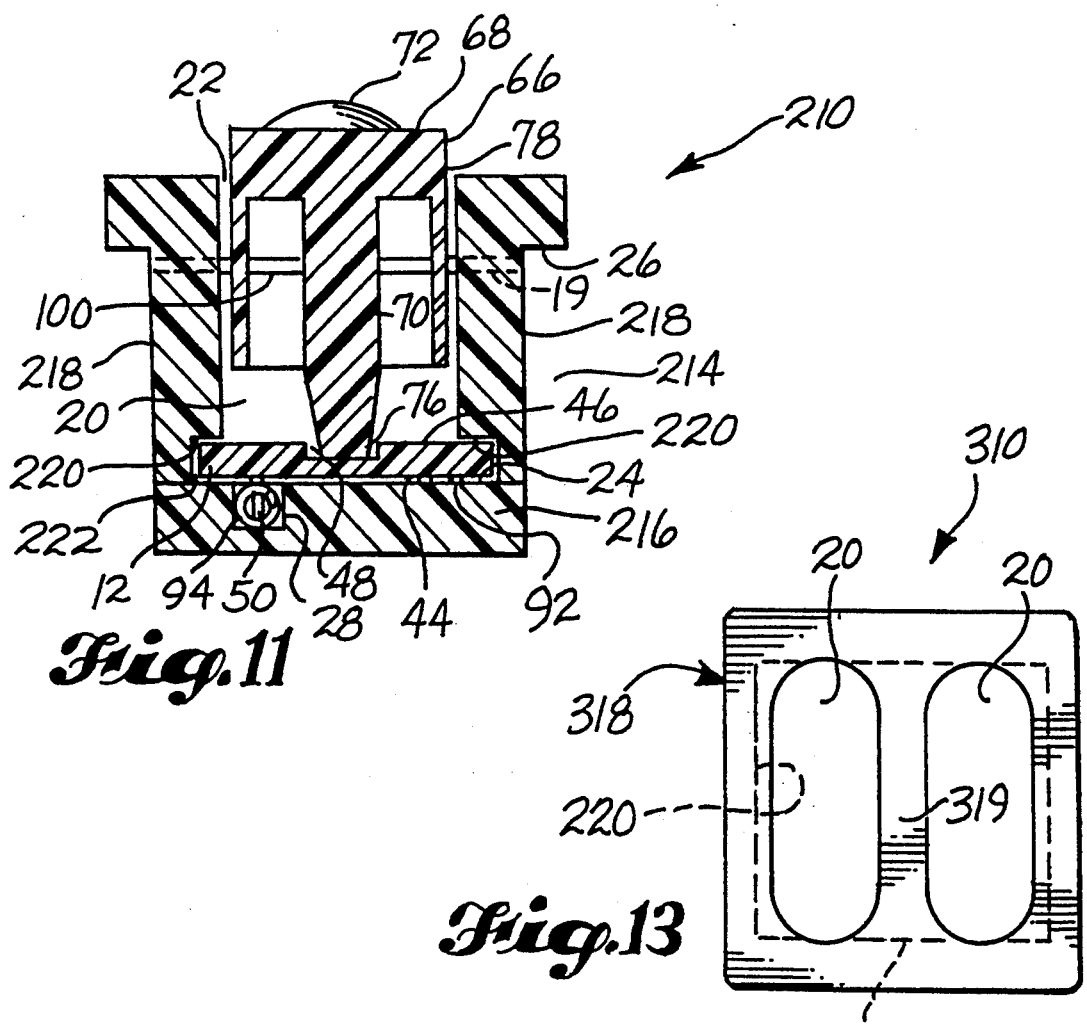
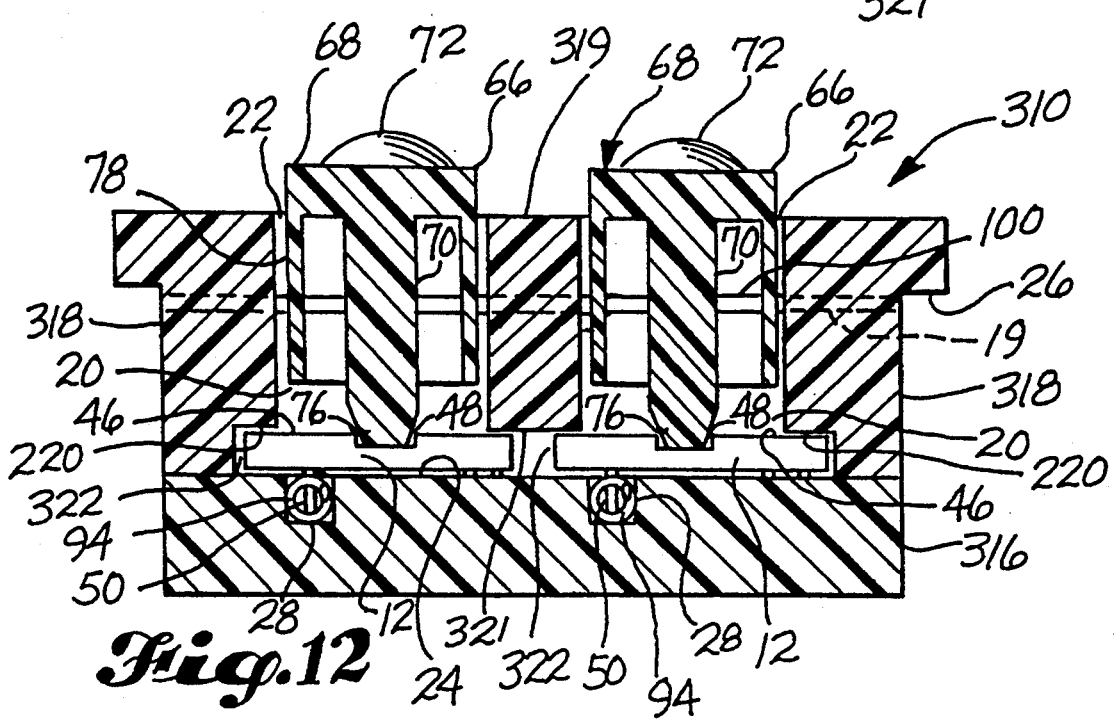

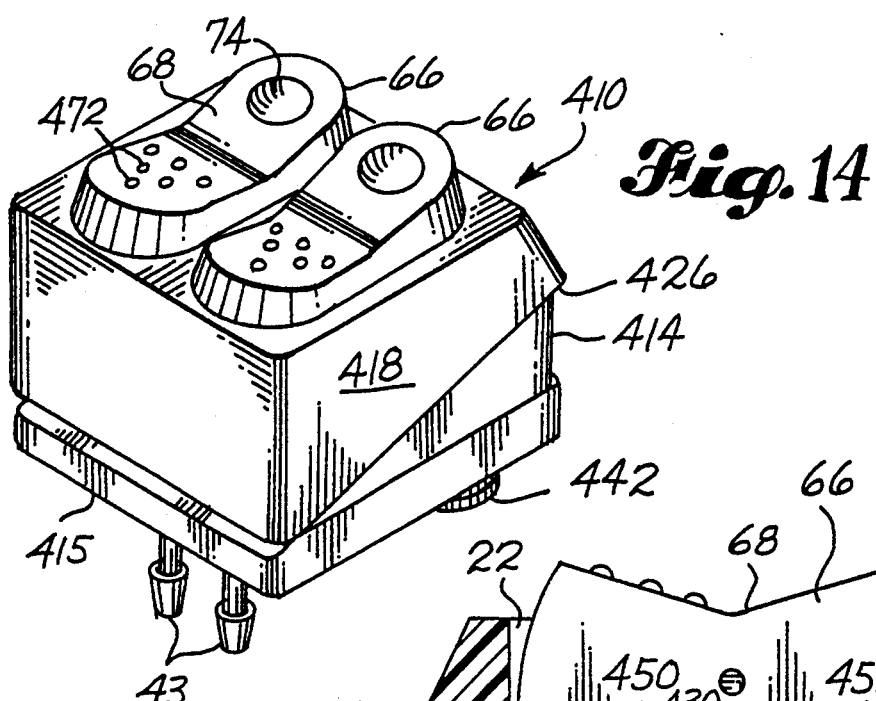
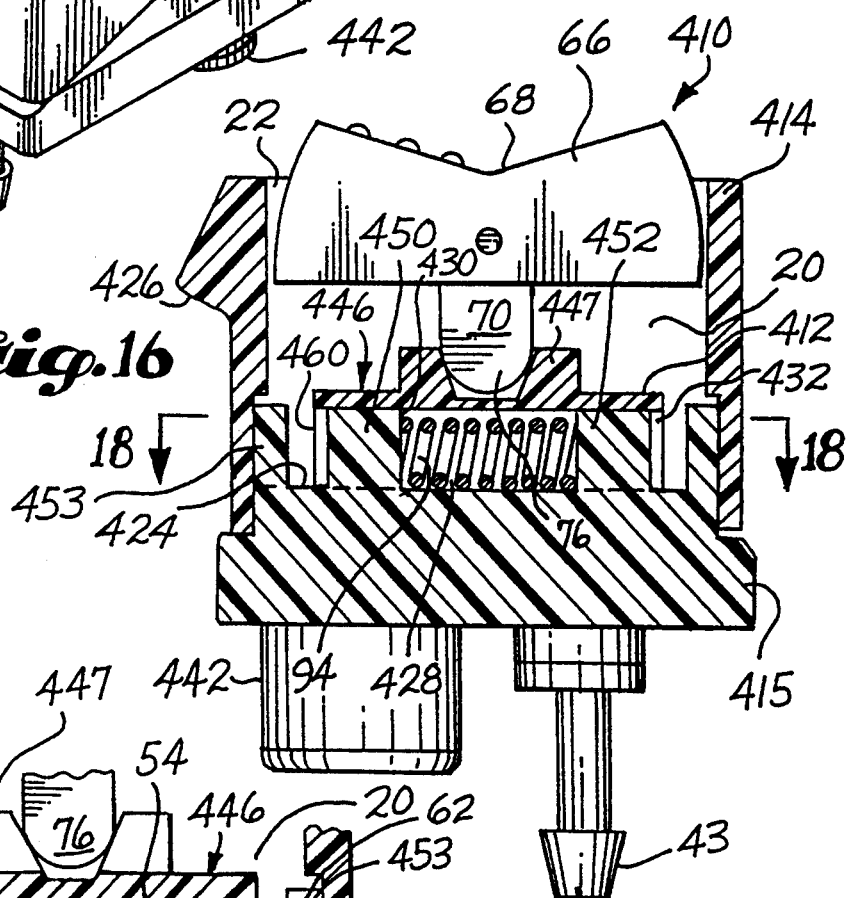
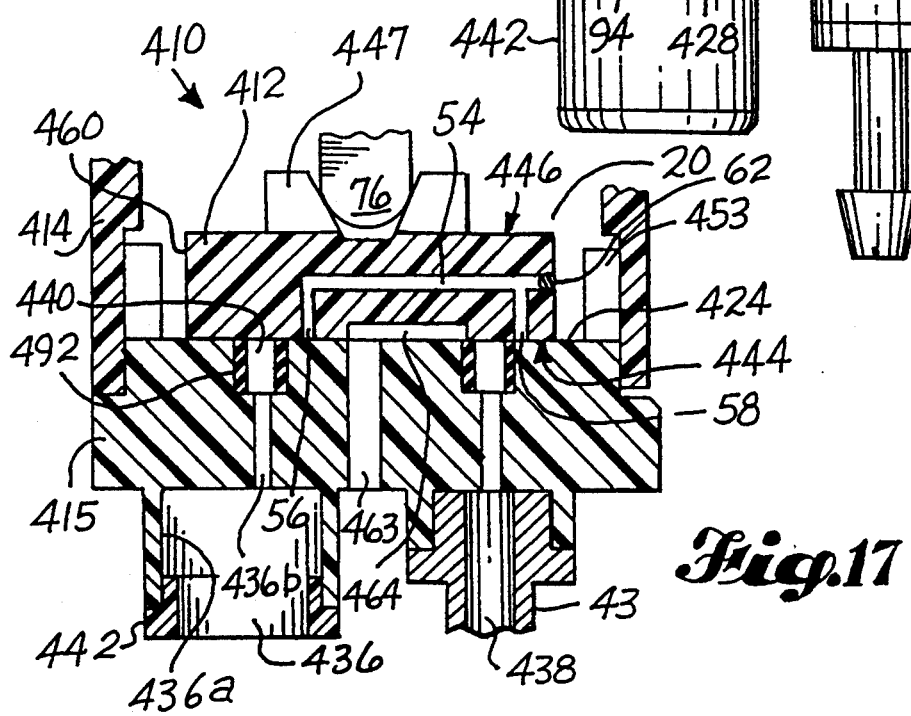

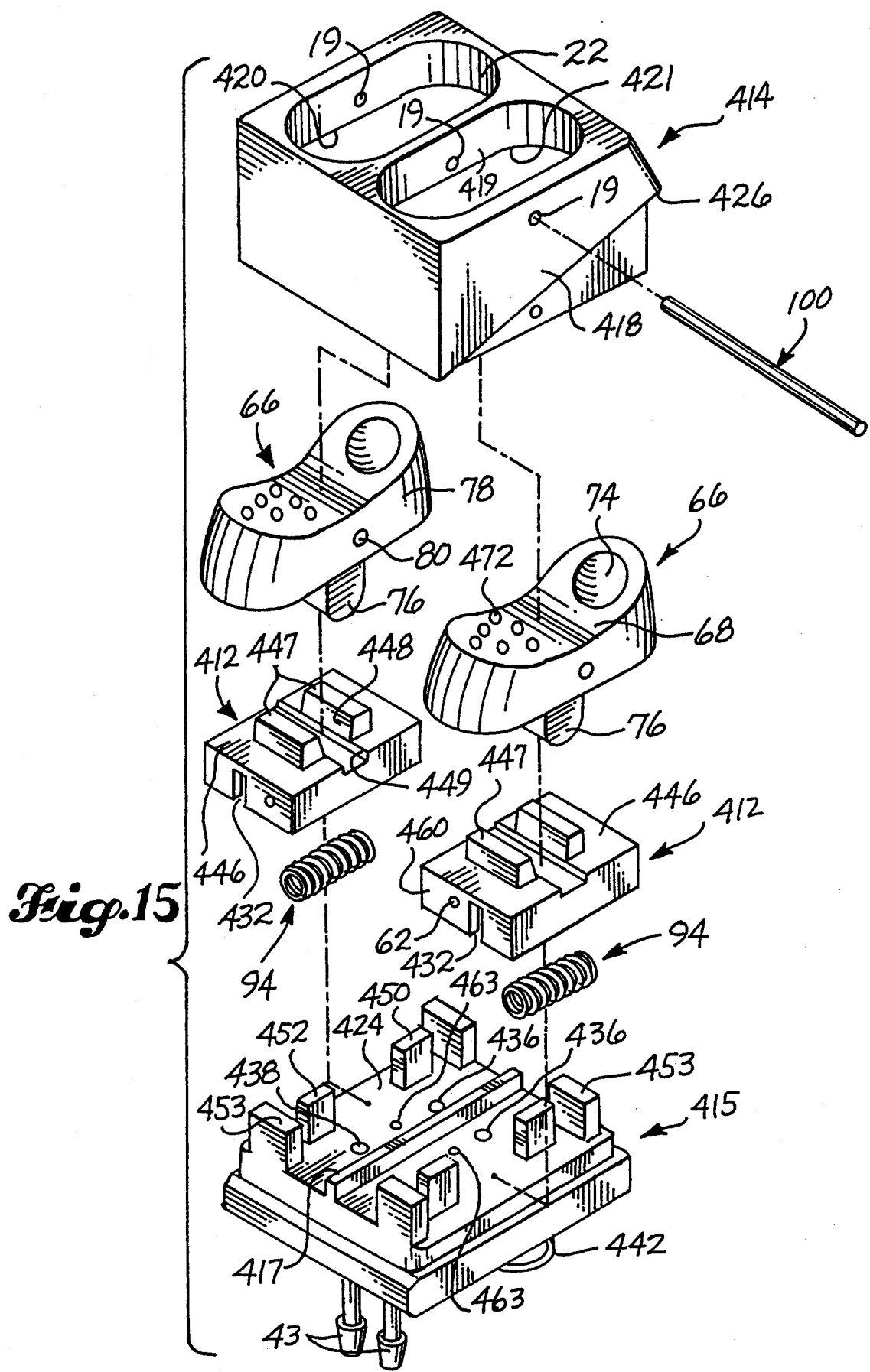

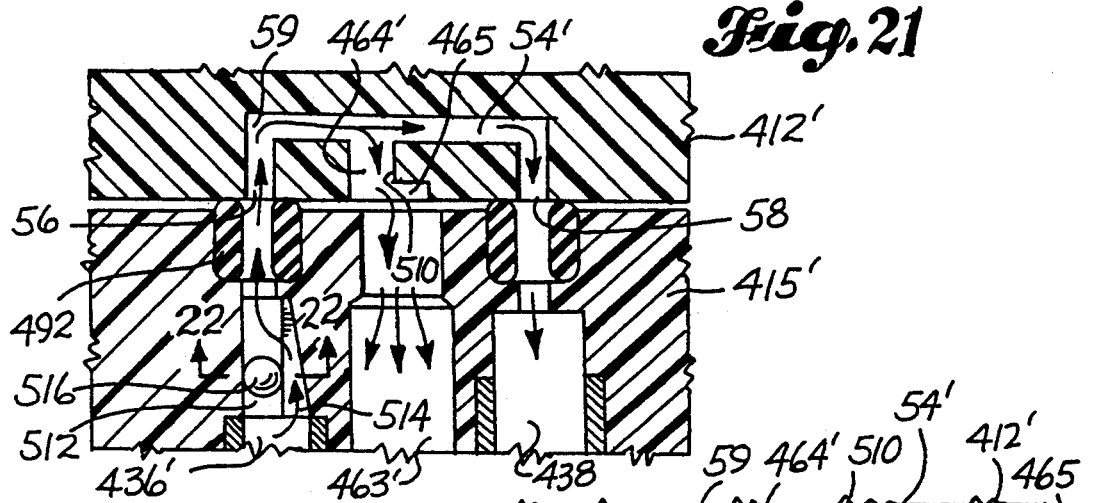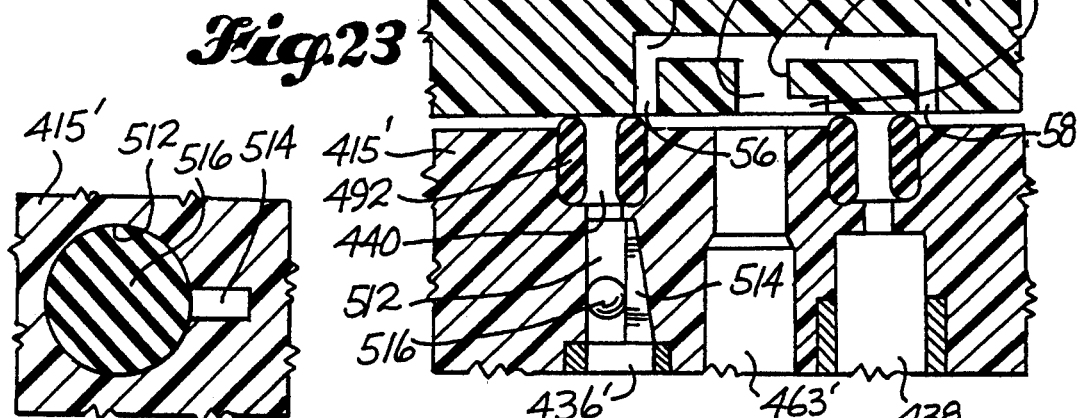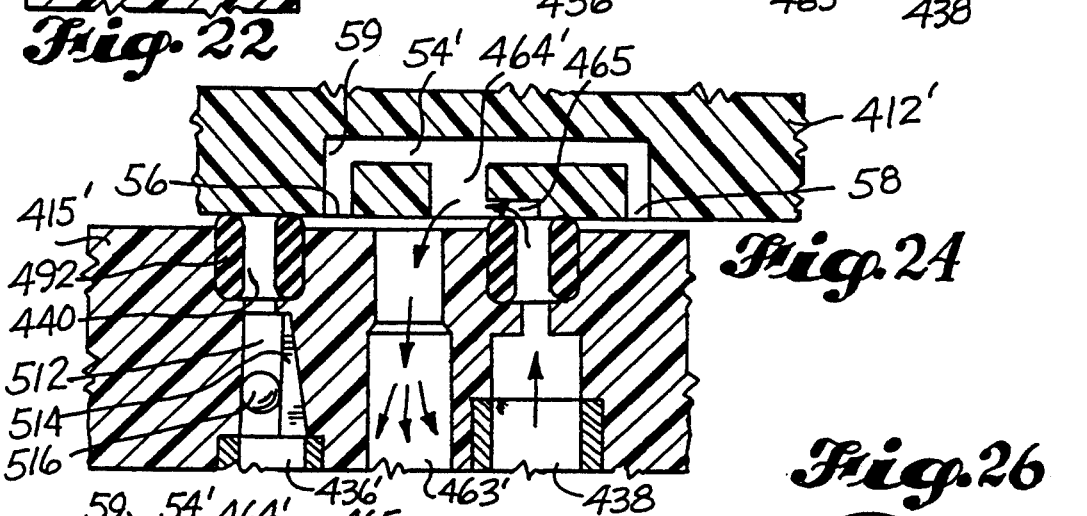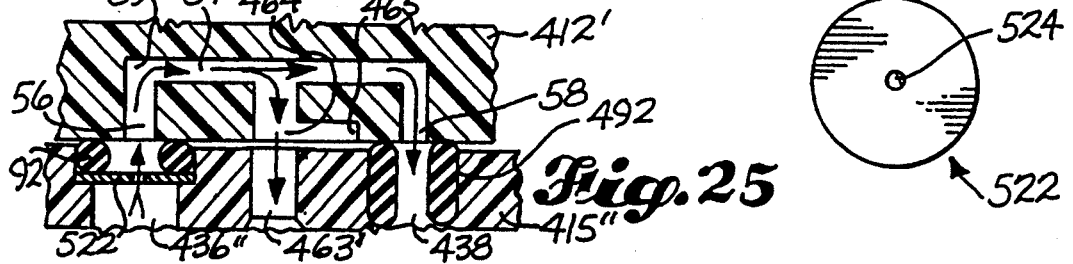

CENTER POSITION BIASED SLIDE AIR VALVE

TECHNICAL FIELD

The present invention relates to air valves. More particularly, the present invention relates to an air valve having a slide bar which is biased into a center position by a spring positioned between projecting pins and which has an outwardly directed socket (or peg) that receives a control peg (or socket) extending from a tilt button, and to a metered inlet and bleed passageway to control outlet pressure.

BACKGROUND OF THE INVENTION

It is common to raise and lower a vehicle seat by inflating and deflating air bags in the seat. An air valve for use in such an environment is disclosed in U.S. Pat. No. 4,976,104, granted Dec. 11, 1990, to John M. Morris and Roger St. John; and U.S. Pat. No. 4,524,951, granted Jun. 25, 1985, to Charles J. Green and Alan K. Forsythe.

DISCLOSURE OF THE INVENTION

One aspect of the present invention relates to a slide bar system for controlling air flow through an air port in an air valve. The air valve includes a slide bar support with a support surface. The air port is in the support and breaks the support surface. The slide bar system comprises a slide bar, an elongated spring well, a coil spring, and a pair of spaced apart pins. The slide bar is supported on the support surface and includes an internal air passageway with an inlet portion. The spring well is in the slide bar or the slide bar support and has a spring abutment at each end with a pin slot at each end extending endwise beyond the spring abutment. The coil spring is within the spring well and has first and second ends which are normally against the abutments. The pins project from the support or the slide bar into the pin slots. The pins are normally at least substantially contiguous to the ends of the spring when the spring is in a center position with its ends against the spring abutments. The spring and pins normally bias the slide bar in a center position. The spring, pins, and pin slots permit movement of the slide bar endwise against the spring into an end position. When the slide bar is in its center position, the air port in the slide bar support is blocked by the slide bar and the inlet portion of the air passageway in the slide bar is blocked by the support. When the slide bar is in its end position, the air port in the slide bar support is in communication with the inlet portion of the air passageway in the slide bar.

The slide bar support preferably includes an annular seal ring well surrounding the air port. A seal ring in the well presents an annular seal surface toward the slide bar. Another preferred feature is the combination of a second air port which breaks the support surface, and an outlet portion of the air passageway. When the slide bar is in its center position, the second air port in the slide bar support is blocked by the slide bar and the outlet portion of the air passageway in the slide bar is blocked by the support. When the slide bar is in its end position, the second air port in the slide bar support is in communication with the outlet portion of the air passageway in the slide bar. In addition, the slide bar may include a vent passageway. When the slide bar is in its center position, the vent passageway is blocked by the support. When the slide bar is in an opposite end position, the second air port in the slide bar support is in communication with the vent passageway in the slide bar.

In some situations, it is desirable to have enhanced control of air pressure in the second air port. In such situations, the air port that communicates with the inlet portion of the air passageway in the slide bar preferably includes a metered aperture to control air flow through the port into the air passageway, and the air passageway includes a bend between its inlet and outlet portions to slow air flow through the air passageway and cooperate with the aperture to control air pressure in the second or outlet air port. A preferred configuration for providing the metered aperture is an inlet port that comprises a passage with an essentially constant cross-section, and a tapered groove extending along and opening onto the passage and tapering toward the support surface. The system includes a plug positioned in the passage. The plug and groove together form the aperture. The plug is adjustable in position along the passage to permit adjustment of the size of the aperture. A vent passageway communicating with the air passageway to bleed off a portion of air flow through the air passageway may also be provided to help control pressure in the second air port. In the preferred embodiment of the system, the vent passageway comprises a slot extending along a surface of the slide bar adjacent to the support. A passageway extends between and communicates the slot and the air passageway. When the slide bar is in a second end position, an inlet end portion of the slot communicates with the second air port to vent air from the second air port.

According to another aspect of the present invention, an air valve is provided which comprises a housing, a slide bar, an elongated spring well, a pair of spaced apart pins, a coil spring, a tilt button, and a pivot pin. The housing has a floor and a sidewall together forming a cavity having an open outer end and an inner end closed by the floor. The floor includes a floor surface, an inlet air port, and an outlet air port spaced from the inlet air port. The inlet air port and the outlet air port break the floor surface. The slide bar is supported on the floor in the cavity and has an inner surface adjacent to the floor surface, an outer surface, and an internal air passageway including an inlet portion breaking the inner surface and an outlet portion breaking the inner surface. The slide bar includes a vent passageway having a first end that breaks the inner surface of the slide bar and a second end. A control peg socket opens outwardly through the slide bar's outer surface. The spring well is in the floor or the slide bar and has, at each end, a spring abutment and a pin slot which extends endwise beyond the spring abutment at that end. The spaced apart pins project from the slide bar or the floor and are normally situated within the pin slots. The coil spring is located in the spring well and has first and second ends. The pins are normally at least substantially contiguous to the ends of the spring. The spring and pins normally bias the slide bar in a center position. The spring, the pins, and the pin slots permit movement of the slide bar endwise against the spring into a first end position and endwise against the spring into an opposite second end position. The tilt button moves the slide bar. The tilt button includes first and second ends and a button body at least partially within the cavity. The body has a front wall adjacent the outer end of the cavity, and a stem projecting inwardly from the front wall with a control peg at its inner end which extends into the control peg socket in the slide bar. The pivot pin extends through opposed portions of the housing sidewall and through a central portion of the tilt button. The pivot pin mounts the tilt button for pivotal movement in two directions about the pivot pin. A push on the first end of the tilt button will tilt the tilt button in position and swing the stem in position and move the control peg to exert an endwise force on the slide bar, moving it from the center position to the first end position. A push on the second end of the tilt button will cause the tilt button to tilt in position in the opposite direction and swing the stem in position in the opposite direction, and move the peg to exert an endwise force on the slide bar in the opposite direction, moving it from the center position to the second end position. When the slide bar is in its center position, both the inlet air port and the outlet air port in the floor of the housing are blocked by the slide bar. When the slide bar is in its first end position, the inlet portion of the air passageway in the slide bar is in communication with the inlet air port in the floor of the housing and the outlet portion of the air passageway in the slide bar is in communication with the outlet air port in the floor of the housing, thereby allowing air to flow from the inlet air port, through the air passageway, to and through the outlet air port. When the slide bar is in its second end position, the inlet air port in the floor of the housing is blocked by the slide bar and the vent passageway in the slide bar is in communication with the outlet air port in the floor of the housing, thereby allowing air to flow from the outlet air port through the vent passageway to the atmosphere.

Preferably, the coil spring is substantially cylindrical, and the spring well has a width corresponding to the diameter of the spring. The pin slots are narrower than the width of the spring well, and shoulder portions of the spring well extend laterally outwardly of the pin slots and form the spring abutments. The spaced apart pins engage central portions of transverse end surfaces of the coil spring which are in alignment with the pin slots.

Another preferred feature of the air valve is the inclusion of means for exerting a force on the outer surface of the slide bar to urge the inner surface of the slide bar toward the housing floor surface and prevent tilting of the slide bar relative to the floor surface. The inner surface of the slide bar is preferably urged against seal rings positioned in annular seal ring wells surrounding the air ports in the floor of the housing. In one preferred embodiment of the air valve, the housing sidewall has opposite shoulders formed thereon that, together with the floor surface, form a slide bar slot for receiving edge portions of the slide bar. The shoulders contact the outer surface of the slide bar along the edge portions to urge the inner surface of the slide bar toward the floor surface and prevent tilting of the slide bar. In other embodiments, a stabilizer frame is positioned between the slide bar and the tilt button. The stabilizer frame has an open center through which the tilt button stem extends. The bottom surface of the stabilizer frame contacts the outer surface of the slide bar to urge the inner surface of the slide bar toward the floor surface and prevent tilting of the slide bar. A preferred form of the stabilizer frame has resilient edge portions and is provided in combination with sidewall recesses opening into the housing cavity. The edge portions of the stabilizer frame are received in the recesses such that the stabilizer frame is snap-fit into the cavity of the housing.

Each of the embodiments of the air valve may be provided with a single slide bar or two or more slide bars. In the latter case, the air valve further comprises a second slide bar, a second spring, a second tilt button, a second spring well having a spring abutment at each end, a second pin slot at each end of the second spring well extending endwise beyond the spring abutment at that end, and a second pair of spaced apart pins projecting into the second pin slots. The housing includes a second inlet air port, and a second outlet air port spaced from the second inlet air port. The second spring is received in the second spring well. The second tilt button is positioned to move the second slide bar. Each of the slide bars is independently operable to control its respective inlet and outlet air ports.

Another aspect of the invention relates to a tilt button system for moving a slide bar in an air valve, wherein the slide bar is biased into a center position and is movable endwise from the center position to a first end position and endwise from the center position to an opposite second end position. According to this aspect of the invention, the system comprises a control peg socket in the slide bar and a tilt button. The tilt button is offset from the slide bar and includes a body having a front wall with a first end and a second end, and a stem projecting from the front wall to the slide bar. The stem includes a control peg at its inner end which extends into the peg socket in the slide bar. The tilt button is supported for pivotal movement about a lateral axis in response to a push on either of said first and second ends. A push on the first end swings the stem in position in a first direction to move the peg against an inner wall portion of the peg socket and move the slide bar from its center position to its first end position. A push on the second end swings the stem in position in the opposite direction to move the peg against an opposite inner wall portion of the peg socket and move the slide bar from its center position to its second end position. The system preferably further includes a stabilizer member positioned to contact the outer surface of the slide bar to guide translational movement of the slide bar in response to a push on said first or second end and prevent tilting of the slide bar. Examples of such stabilizer members include the housing shoulders and stabilizer frame described above.

According to still another aspect of the invention, an air valve comprises a housing, a slide bar, a tilt button, and a pivot pin. The housing has a floor and a sidewall together forming a cavity having an open outer end and an inner end closed by the floor. The floor includes a floor surface and at least one air port breaking the floor surface. The slide bar has an inner surface, an outer surface, an internal air passageway including an inlet portion breaking the inner surface, and a control peg socket opening outwardly through its outer surface. The slide bar is supported on the floor with its inner surface adjacent to the floor surface. The tilt button is for moving the slide bar. The tilt button includes a button body at least partially within the housing cavity. A front wall of the body has first and second ends and is substantially adjacent the outer end of the cavity. A stem projects inwardly from the front wall and includes a control peg at its inner end which extends into the control peg socket in the slide bar. The pivot pin extends through opposed portions of the housing sidewall and through a central portion of the tilt button body. The pivot pin mounts the tilt button for pivotal movement about an axis. A push on one of said first and second ends tilts the tilt button in position and swings the stem in position and moves the peg to exert an endwise force on the slide bar, moving the slide bar from a center position to a first end position. When the slide bar is in one of these positions, the air port in the floor of the housing is closed by the slide bar. When the slide bar is in the other position, the air port in the floor of the housing is in communication with the inlet portion of the passageway in the slide bar. The air valve may also be provided with one or more of the additional features discussed above.

According to yet another aspect of the invention, an air valve comprises a housing including an inlet air port and an outlet air port, and a valve member including an internal air passageway with an inlet portion and an outlet portion. The valve member has a first position in which the valve member blocks communication between the ports, and a second position in which the inlet portion is in communication with the inlet air port and the outlet portion is in communication with the outlet air port to allow air flow through the passageway from the inlet air port to the outlet air port. The inlet air port includes a passage with an essentially constant cross-section, and a tapered groove extending along and opening onto the passage and tapering toward the inlet portion. The valve includes a plug positioned in the passage to define, together with the groove, a metered aperture to control air flow through the inlet air port into the passageway and thereby control air pressure in the outlet air port. The plug is adjustable in position along the passage to permit adjustment of the size of the aperture to adjust air pressure in the outlet air port.

A preferred feature of the air valve is an internal air passageway that includes a bend between the inlet portion and the outlet portion to slow air flow through the passageway and cooperate with the aperture to control air pressure in the outlet air port. Another preferred feature is the inclusion in the valve member of a vent passageway communicating with the air passageway to bleed off a portion of air flow through the air passageway from the inlet air port and thereby help control pressure in the outlet air port. In its preferred form, the vent passageway has an inlet end portion that is blocked from communication with the outlet air port when the valve member is in either of its first and second positions. The valve member has a third position in which the inlet end portion of the vent passageway is in communication with the outlet air port to vent air from the outlet air port.

The valve member may take various forms. In its preferred form, the valve member comprises a slide bar slidable between the first and second positions. The valve housing includes a support surface on which the slide bar is supported and to which the inlet and outlet portions of the passageway are adjacent. The inlet air port and the outlet air port both break the support surface. The slide bar preferably includes a vent passageway to bleed off a portion of air flow, as described above. In the preferred embodiment, the vent passageway comprises a slot extending along a surface of the slide bar adjacent to the support surface, and a passageway extending between and communicating the slot and the internal air passageway. The slot has an inlet end portion that is blocked from communication with the outlet air port when the slide bar is in either of the first and second positions and that communicates with the outlet air port when the slide bar is in a third position.

Other objects, features and advantages of the invention are hereinafter described in the description of the best modes of the invention.

BRIEF DESCRIPTION OF THE DRAWINGS

Like reference numerals are used to indicate like parts throughout the various figures of the drawing, wherein:

FIG. 6 is like FIG. 4 except it shows the slide bar in an end position;

FIG. 7 is like FIG. 5 with the slide bar positioned as shown in FIG. 6;

FIG. 8 is like FIGS. 4 and 6 with the slide bar shown in a second end position;

FIG. 11 is a sectional view of another embodiment of the air valve of the present invention;

FIG. 12 is a sectional view of a tandem air valve of the present invention;

FIG. 13 is a top plan view of the upper housing portion shown in FIG. 12;

FIG. 14 is a pictorial view of another embodiment of the air valve of the invention which has tandem tilt buttons and slide bars and in which the positioning of the spring well and pins is modified;

FIG. 15 is an exploded pictorial view of the valve shown in FIG. 14;

FIG. 16 is a sectional view of the valve shown in FIGS. 14 and 15 taken along the line 16—16 in FIG. 18;

FIG. 17 is a sectional view taken along the line 17—17 in FIG. 18, with upper portions omitted and the slide bar in its center position;

FIG. 21 is a fragmentary sectional view of a modified embodiment of the valve shown in FIGS. 14-20 in which the inlet air port includes a metered aperture, with the slide bar shown in a first end position;

FIG. 22 is a sectional view taken along the line 22—22 in FIG. 21;

FIG. 23 is like FIG. 21 except that it shows the slide bar in its center position;

FIG. 24 is like FIG. 21 except that it shows the slide bar in an opposite end position;

FIG. 25 is similar to FIG. 21 except that it shows an alternative form of the modified valve with a metered inlet aperture;

FIG. 26 is a plan view of the apertured disk shown in FIG. 25;

MODE FOR CARRYING OUT THE INVENTION

Figure 1:
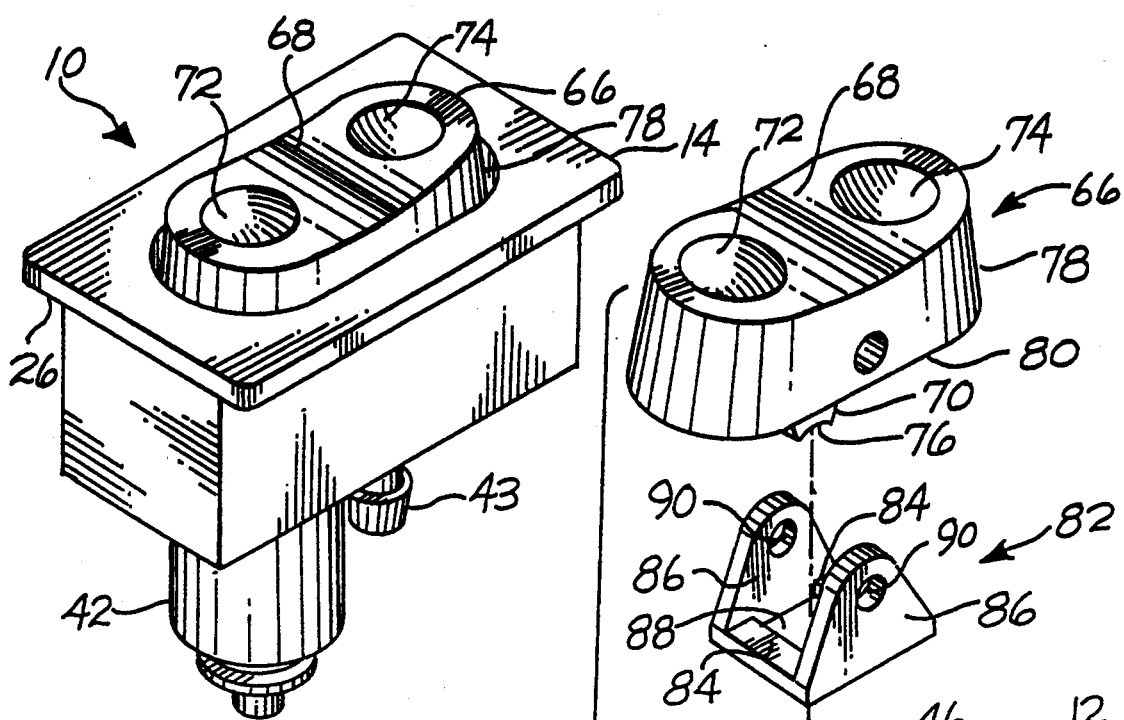
FIG. 1 is a pictorial view of an air valve of the present invention.
Figure 2:
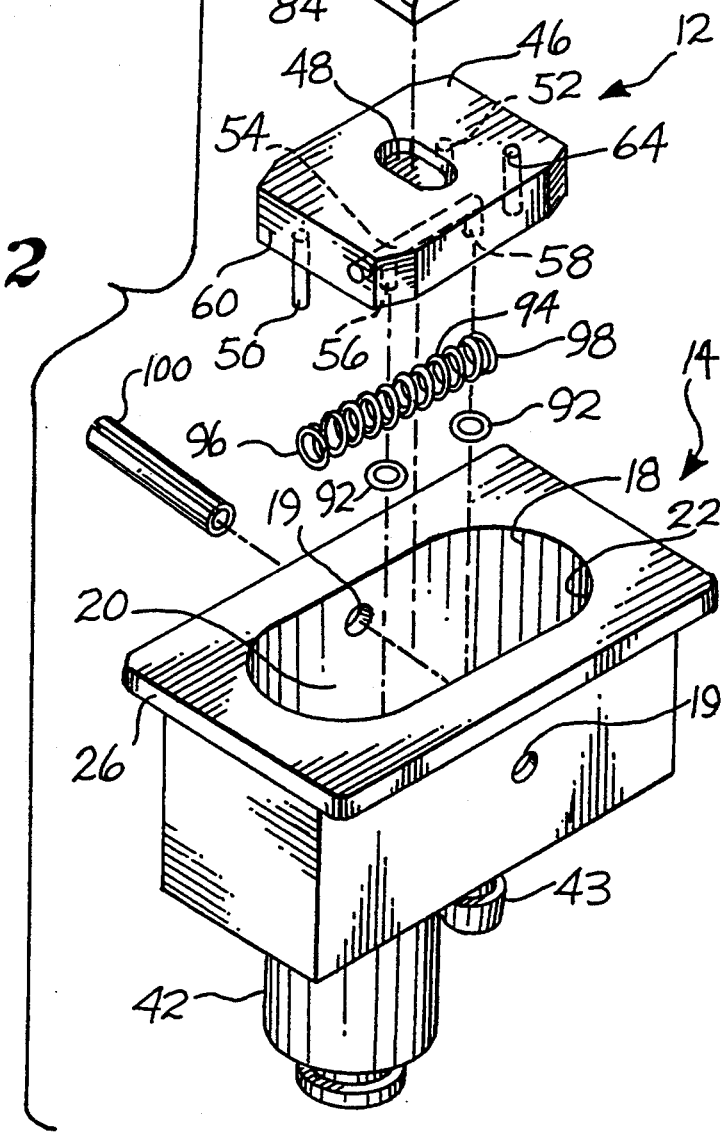
FIG. 2 is an exploded pictorial view of the air valve shown in FIG. 1.

As illustrated in FIGS. 1-9, the present invention provides an air valve 10 with a center position biased air flow controlling slide bar 12. In the center position, the air valve 10 prevents both flow of air from an air supply (not shown) to an inflatable (not shown) and venting of the inflatable. The air valve 10 may be operated to permit flow of air from the air supply to the inflatable and to permit venting of air from the inflatable.

Referring to FIGS. 1 through 9, the air valve 10 has a housing 14 with a floor 16 and a sidewall 18 extending upwardly from the floor 16. The floor 16 and the sidewall 18 form a cup-like cavity 20 with an open outer end 22 and an inner end which is closed by the floor 16. Openings 19 are formed in opposed portions of the sidewall 18. The floor 16 has a floor surface 24. A lip 26 extends outwardly from the sidewall 18 adjacent the open outer end 22. Preferably the housing 14 is a single piece made from molded plastic.

An elongated spring well 28 is formed in the floor 16 and has a spring abutment 30 at each end. A pin slot 32 extends endwise beyond the spring well 28 at each end of the spring well 28. The pin slot 32 has a width smaller than the width of the spring well 28 so that opposite shoulders are formed at the juncture of each pin slot 32 and the spring well 28. The shoulders provide the spring abutments 30. The spring well 28 and the pin slots 32 break the floor surface 24 of the floor 16.

Figure 5:
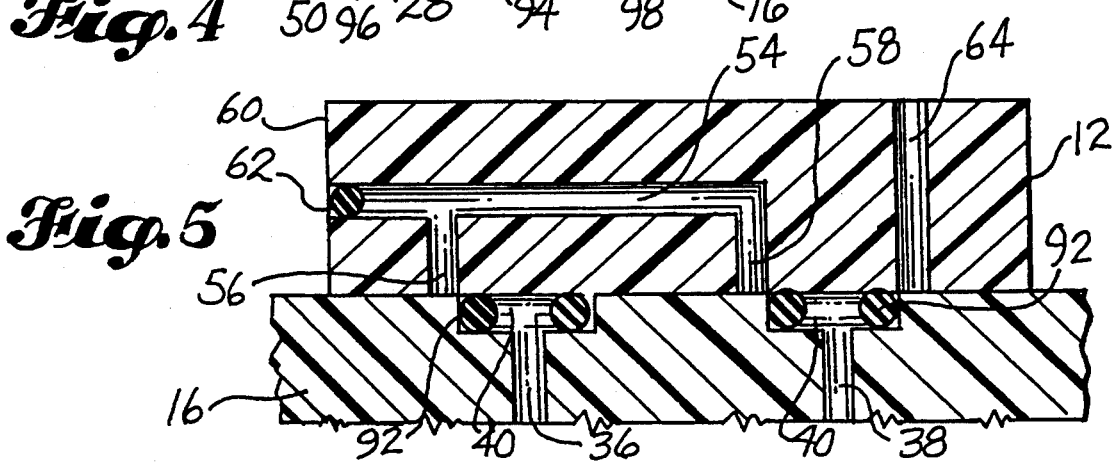
FIG. 5 is an enlarged fragmentary cross-sectional view of the air valve shown in FIGS. 1-4 taken across line 5—5 in FIG. 3, with the slide bar positioned as shown in FIG. 4.
Figure 9:
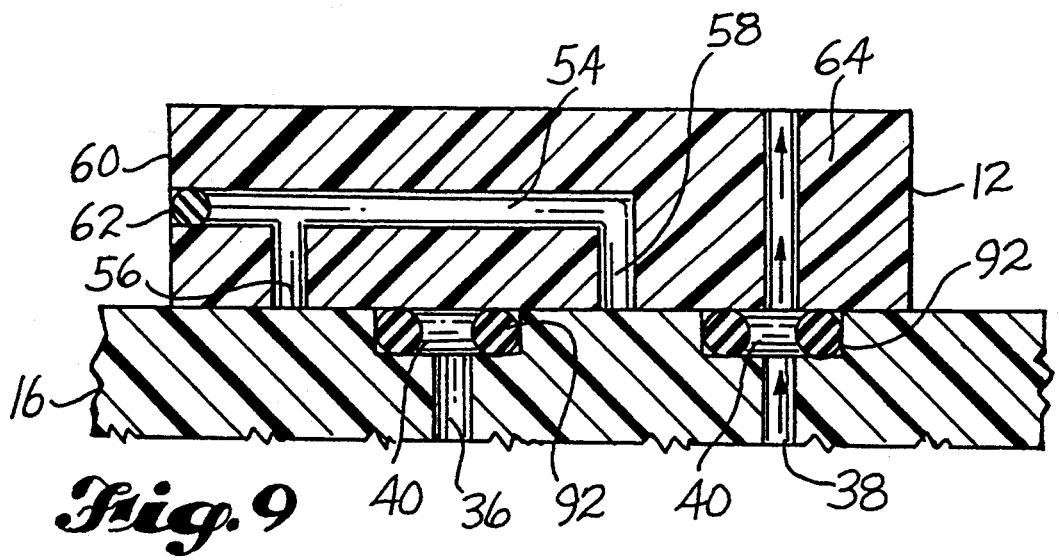
FIG. 9 is like FIGS. 5 and 7 with the slide bar positioned as shown in FIG. 8.

As illustrated in FIGS. 5, 7, and 9, an inlet air port 36 and an outlet air port 38 are formed in the floor 16 of the housing 14. The inlet air port 36 and the outlet air port 38 extend through the floor 16 and break the floor surface 24. An annular seal ring well 40 is formed in the floor 16 around the inlet air port 36 and the outlet air port 38. The annular seal ring wells 40 break the floor surface 24. As shown, the inlet air port 36 is in communication with a standard snap connector 42, and the outlet air port 38 is in communication with a standard barb-type connector 43. Each of these connectors could be replaced by the other type of connector or by some other suitable connector.

The slide bar 12 has an inner surface 44 and an outer surface 46. A control peg socket 48 is formed in the slide bar 12 and opens outwardly, breaking the outer surface 46. The bottom of the control peg socket 48 has a convex curvature. The slide bar 12 includes a first pin 50 and a second pin 52 projecting from the inner surface 44 of the slide bar 12. The first pin 50 is spaced from the second pin 52.

As illustrated in FIGS. 2, 5, 7, and 9, an internal air passageway 54 is formed in the slide bar 12. The internal air passageway 54 includes an inlet portion 56 and an outlet portion 58 which break the inner surface 44, and a horizontal (as shown) midportion connecting the inlet and outlet portions 56, 58. To facilitate manufacture, the midportion is formed in the slide bar 12 to break through a side 60 of the slide bar 12. A plug 62 is inserted into the internal air passageway 54, adjacent the side 60, to seal the internal air passageway 54 from the side 60. A vent passageway 64 is also formed in the slide bar 12. The vent passageway 64 has a first end which breaks the inner surface 44 of the slide bar 12 and a second end which breaks the outer surface 46 of the slide bar 12.

The air valve 10 includes a tilt button 66 operable for moving the slide bar 12. The tilt button 66 has a button body with a front wall 68 adjacent to the outer end 22 of the cavity 20 and a stem 70 projecting from the front wall 68 into the cavity 20. A convex button 72 is located at a first end of the button body and a concave button 74 is located at a second end of the button body. Both the convex button 72 and the concave button 74 are positioned on the front wall 68. The stem 70 includes a control peg 76 at its inner end. The inner end surface of the control peg 76 has a concave curvature. The button body includes a sidewall 78 which extends from the front wall 68. The sidewall 78 is spaced from and surrounds a portion of the stem 70. Pivot pin openings 80 are formed in a central portion of the stem 70 and in opposed portions of the tilt button sidewall 78.

Referring to FIGS. 2, 4, 6, and 8, the air valve 10 includes a stabilizer frame 82 with a bottom 84 and side portions 86 extending upwardly from the bottom 84. The bottom 84 has a center opening 88 extending therethrough. Pivot pin openings 90 are formed in the side portions 86.

Figure 3:
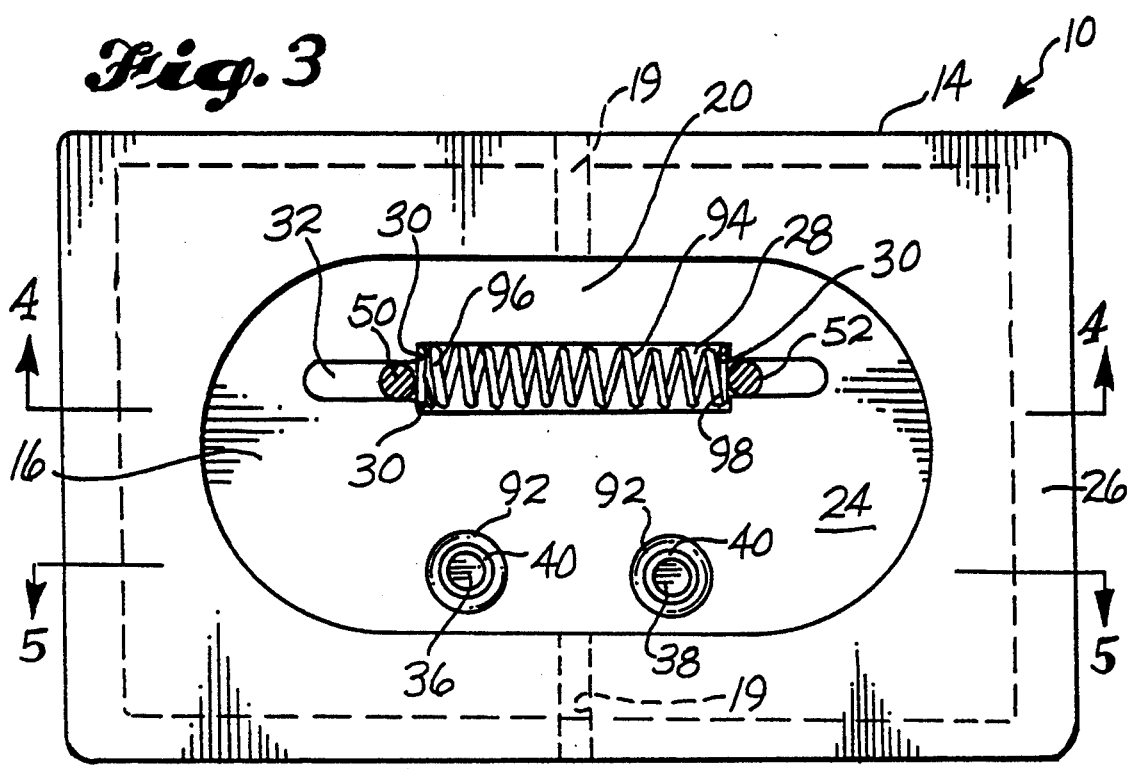
FIG. 3 is a top view of the air valve shown in FIGS. 1 and 2 with the tilt button, stabilizer frame, pivot pin, and a portion of the slide bar removed.

The embodiment of the air valve 10 illustrated in FIGS. 1–9 is assembled in the following manner. O-rings or seal rings 92 are placed in the annular seal ring wells 40 in the housing 14. A cylindrical coil spring 94 having a first end 96 and a second opposite end 98 with a transverse end surface at each end 96, 98 is placed in the spring well 28 in the housing 14. The diameter of the spring 94 corresponds to the width of the spring well 28 and the spring 94 is slightly longer than the spring well 28 so that the ends 96, 98 of the spring 94 abut the spring well shoulders 30, and the spring 94 is slightly compressed between the opposite shoulders 30. Then, the slide bar 12 is placed in the cavity 20 of the housing 14 with the pins 50, 52 being received in the opposed pin slots 32. As illustrated in FIG. 3, in the normal centered position of the slide bar 12, the pins 50, 52 are at least substantially contiguous to the transverse end surfaces 96, 98 of the spring 94. The inner surface 44 of the slide bar 12 is adjacent the floor surface 24. Each seal ring 92 presents an annular seal surface toward the slide bar 12. The floor 16 of the housing 14, including the seals 92, provides a support for the slide bar 12. In the fully assembled valve 10, the seal rings 92 seal the slide bar 12 against the floor surface 24 at the inlet air port 36 and the outlet air port 38.

Figure 4:
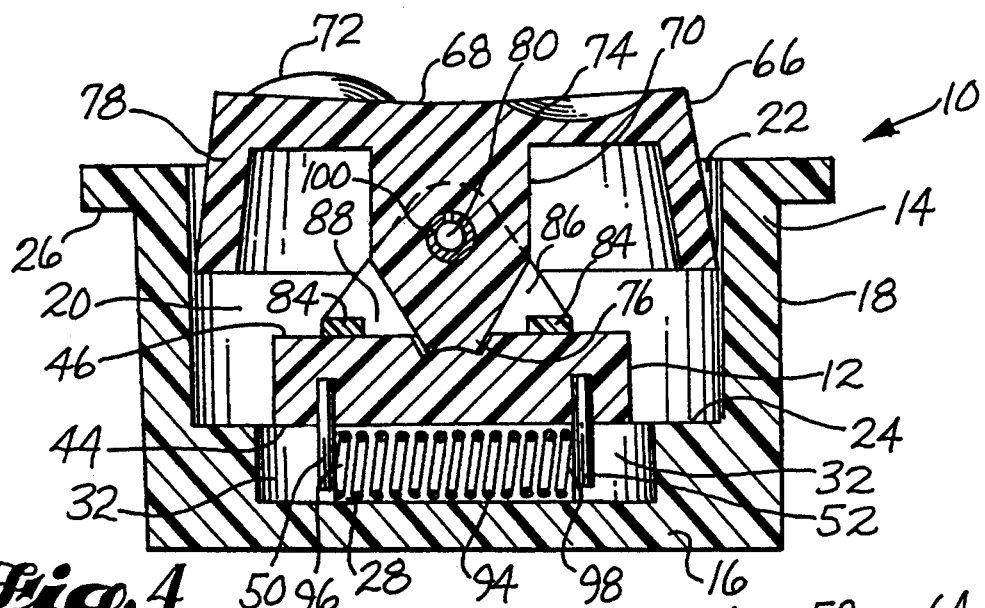
FIG. 4 is a cross-sectional view of the air valve shown in FIGS. 1-3 taken across line 4—4 in FIG. 3 with the slide bar in a centered position.

The stabilizer frame 82 is placed in the cavity 20 of the housing 14 with the bottom 84 of the stabilizer frame 82 adjacent the outer surface 46 of the slide bar 12. The center opening 88 in the stabilizer frame 82 is aligned with the control peg socket 48 in the slide bar 12. The tilt button 66 is positioned in the air valve 10 at least partially within the cavity 20. As illustrated in FIG. 4, the front wall 68 is positioned outside of the cavity 20, adjacent the open outer end 22 of the cavity 20. The control peg 76 on the stem 70 extends through the center opening 88 in the stabilizer frame 82 and into the control peg socket 48 in the slide bar 12. The concave curvature of the end of the control peg 76 fits over the convex curvature of the bottom of the control peg socket 48. Then, a pivot pin 100 is inserted sequentially through one of the openings 19 in the sidewall 18 of the housing 14, one of the pivot pin openings 80 in the tilt button sidewall 78, one of the pivot pin openings 90 in the stabilizer frame 82, and then the other openings 90, 80, 19.

Once installed, the pivot pin 100 pivotably mounts the tilt button 66 on the housing 14 and attaches the stabilizer frame 82 to the housing 14. The frame 82 is sized so that its pin mounting pushes it downwardly against the slide bar 12. The bottom surface of the frame 82 is urged against the outer surface 46 of the slide bar 12 to urge the inner surface 44 of the slide bar 12 toward the floor surface 24 and against the seal surfaces of the seal rings 92. This provides good sealing engagement between the slide bar 12 and the housing 14 around the ports 36, 38 and helps prevent tilting of the slide bar 12 relative to the floor surface 24.

For use of the air valve 10 illustrated in FIGS. 1–9 to fill an inflatable (not shown) with air, the snap connector 42 is connected to an air supply (not shown). The barb connector 43 is connected to an inflatable, such as an air bag in a seat.

Figure 10:
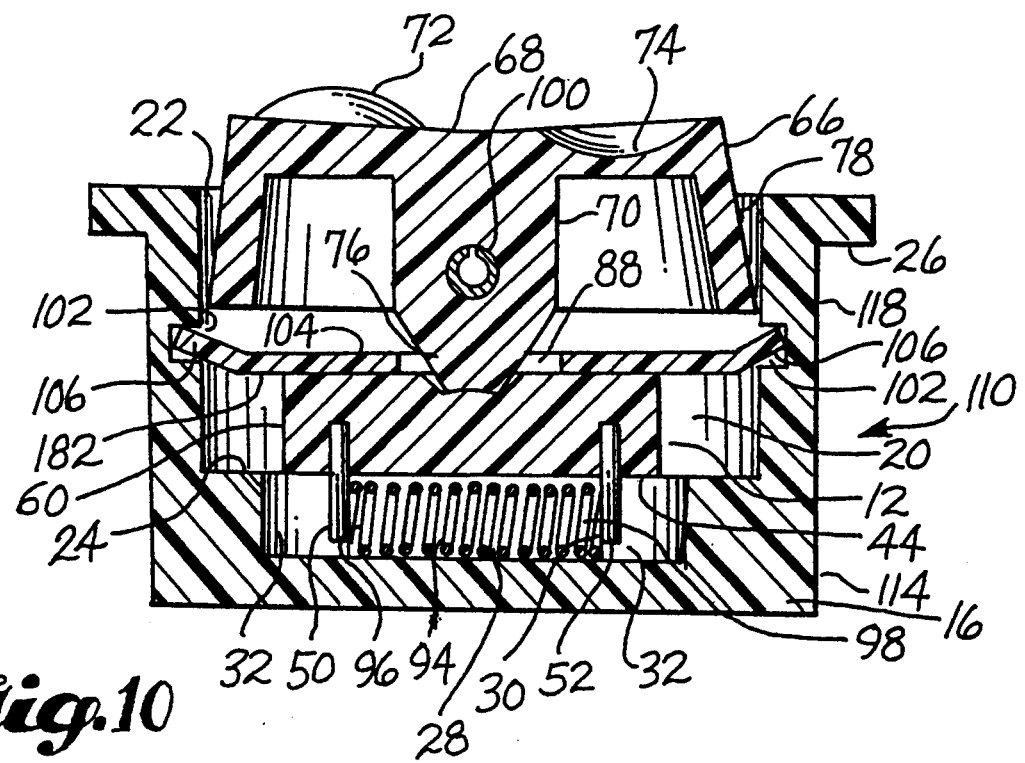
FIG. 10 is a sectional view of another embodiment of the air valve of the present invention.

FIG. 10 illustrates an embodiment of the air valve 110 similar to that shown in FIGS. 1–9. The only difference between the two embodiments is the structure and method of mounting the stabilizer frame. In the air valve 110 illustrated in FIG. 10, the sidewall 118 of the housing 114 forms opposed recesses 102 opening into the cavity 20. The stabilizer frame 182 has an elongated body portion 104 forming a center opening 88. The resilient opposite edge portions 106 of the stabilizer frame 182 are angled relative to the body portion 104. The spring 94, seal rings 92, and slide bar 12 are assembled in the housing 114 as discussed above for the embodiment of the air valve 10 illustrated in FIGS. 1–9. Then, the stabilizer frame 182 is pushed downwardly into the cavity 20 of the housing 114 with the edge portions 106 bending upwardly until they reach the recesses 102. The edge portions 106 are snap-fit into the recesses 102 to secure the frame 182 to the housing 114. The center opening 88 of the frame 182 is aligned with the control peg socket 48 in the slide bar 12. The tilt button 66 is pivotably mounted on the housing 114 by a pivot pin 100. In the assembled air valve 110, the frame 182 urges the slide bar 12 toward the floor surface 24 and against the seals 92 and prevents tilting of the slide bar 12, as described above.

FIG. 11 illustrates another embodiment of the air valve 210 of the present invention. In FIG. 11, the air valve 210 is configured such that a stabilizer frame is not required. The housing 214 is formed from a floor portion 216 and a sidewall portion 218. The floor portion 216 includes a floor surface 24, a spring well 28, pin slots 32, and air ports 36, 38, as described above in connection with the embodiment of the air valve 10 illustrated in FIGS. 1–9. The sidewall portion 218 includes opposite downwardly facing shoulders 220 that, together with the floor surface 24, form a slide bar slot 222 in the assembled air valve 210. The air valve 210 is assembled by positioning the spring 94 in the spring well 28 and the seal rings 92 in the seal ring wells 40, as described for the embodiment of the air valve 10 illustrated in FIGS. 1–9. Then, the slide bar 12 is positioned on the floor portion 216 with the pins 50, 52 being received in the pin slots 32 and the inner surface 44 of the slide bar 12 adjacent to the floor surface 24, as described above. Then, the sidewall portion 218 is placed on the floor portion 216 and fastened thereto such that edge portions of the slide bar 12 are received in the slot 222 formed by the shoulders 220 and the floor surface 24. The sidewall portion 218 may be fastened to the floor portion 216 by fasteners, tongue and groove pieces, adhesives, or any other suitable fastening method. Then, the tilt button 66 is pivotably mounted on the housing 214 with the control peg 76 engaging the slide bar 12, as described above. In the assembled valve 210, the shoulders 220 contact the outer surface 46 of the slide bar 12 along the edge portions of the slide bar 12 that are received in the slot 222. The contact urges the inner surface of the slide bar 12 toward the floor surface 24 to provide sealing engagement and prevent tilting, as described above.

FIGS. 12 and 13 illustrate an embodiment of the air valve 310 similar to that shown in FIG. 11, but with a tandem control system for regulating the flow of air to and from two different inflatables (not shown). The valve 310 may be used, for example, for controlling a seat air bag and a lumbar support in a truck cab. The valve 310 includes a floor portion 316 with two spring wells 28 and corresponding pin slots 32, and two sets of air ports 36, 38 and corresponding seal ring wells 40. The upper (as shown) sidewall portion 318 has opposite shoulders 220 and an integral center divider wall 319. The divider wall 319 has a bottom surface 321 aligned with the shoulders 220 and, in the assembled valve 310, separates two cavities 20. The valve 310 is assembled using two slide bars 12 and two tilt buttons 66. Each slide bar 12 is positioned on the floor surface 24 with its pins 50, 52 being received in the corresponding pin slots 32, as described above. Then, the sidewall portion 312 is secured to the floor portion 316 and the tilt buttons 66 are pivotably mounted by a pivot pin 100. A slide bar slot 322 is formed in each cavity 20 between the floor surface 24 and the downwardly facing shoulder 220 and divider wall 319. The slide bars 12 are received into their corresponding slots 322 and are urged toward the floor surface 24 by contact with the shoulders 220 and divider wall bottom surface 321, as described above. Each slide bar 12 is independently operable by its corresponding tilt button 66.

The air valve of the present invention includes a slide bar system to control flow of air through the air valve. Referring to FIGS. 1–13, in operation, the ends 96, 98 of the spring 94 engage the pins 50, 52 and normally bias the slide bar 12 into a center position, as illustrated in FIG. 4. The control peg socket 48 positions the tilt button 66 in a center position, as illustrated in FIG. 4. In the center position, the inlet portion 56 and the outlet portion 58 of the internal air passageway 54 in the slide bar 12 and the vent passageway 64 in the slide bar 12 are out of alignment with the air ports 36, 38 in the floor 16, as illustrated in FIG. 5. The slide bar 12 sealingly blocks both ports 36, 38, and the floor surface 24 blocks the passageway ends 56, 58. Thus, in the center position, the slide bar 12 blocks the flow of air to or from the inflatable.

To introduce air from the air supply to the inflatable, a force is exerted on the convex button 72 of the tilt button 66 to pivot the tilt button 66 about the lateral axis of the pivot pin 100, as shown in FIG. 6. As the tilt button 66 pivots, the control peg 76 on the stem 70 exerts an endwise force on the convex bottom of the control peg socket 48 and pushes the slide bar 12. As the slide bar 12 is translated laterally by the control peg 76, the first pin 50 of the slide bar 12 presses against the first end 96 of the spring 94, and the spring 94 is compressed between the pin 50 and the opposite shoulders 30 of the spring well 28. The second pin 52 moves further into its pin slot 32 out of engagement with the spring 94. Referring to FIG. 7, as the slide bar 12 is moved into an end position relative to the housing 14, the inlet portion 56 of the air passageway 54 in the slide bar 12 is brought into alignment with the inlet air port 36 in the housing 14 and the outlet portion 58 of the air passageway 54 is brought into alignment with the outlet air port 38. This allows air to pass from the air supply through the inlet air port 36, the air passageway 54, and the outlet air port 38, and to the inflatable, as illustrated by the arrows in FIG. 7. The seal rings 92 prevent air from leaking into the cavity 20. Once the inflatable has been filled to the desired level, the pressure is removed from the convex button 72. When the pressure is removed from the convex button 72, the spring 94 moves the first pin 50 back into its pin slot 32 and the slide bar 12 back into the center position shown in FIG. 4. As the slide bar 12 moves into its center position, the engagement of the control peg 76 in the control peg socket 48 pivots the tilt button 66 back into the untilted position illustrated in FIG. 4.

Referring to FIGS. 8 and 9, to release air from the inflatable, pressure is exerted on the concave button 74 of the tilt button 66 to pivot the tilt button 66 about its axis in the opposite direction. As the tilt button 66 pivots, the control peg 76 pushes against the convex bottom of the control peg socket 48 causing the slide bar 12 to move to an opposite end position relative to the housing 14. As the slide bar 12 moves, the second pin 52 pushes against the second end 98 of the spring 94 to compress the spring 94 against the opposite shoulders 34, and the vent passageway 64 is brought into alignment with the outlet air port 38, as illustrated in FIG. 9. This allows air to pass from the inflatable out of the outlet air port 38, through the vent passageway 64, and into the cavity 20 of the housing 14, as illustrated by the arrows in FIG. 9. From the cavity 20, the air is vented to the atmosphere. When the pressure is removed from the concave button 74 of the tilt button 66, the spring 94 returns the slide bar 12 to its center position and the tilt button 66 to its untilted position, as shown in FIG. 4.

During operation of the air valves 10, 110 illustrated in FIGS. 1–10, the stabilizer frame 82, 182 remains stationary and continuously exerts a downward force on the slide bar 12. This maintains the sealing engagement of the slide bar 12 and the housing 14, 114 and prevents tilting of the slide bar 12. It also guides translational movement of the slide bar 12 when it is being moved by the tilt button 66. In the air valves 210, 310 illustrated in FIGS. 11 and 12, these functions are performed by the shoulders 220 and, in the case of the valve 310 shown in FIG. 12, by the shoulder 321 provided by the bottom surface of the divider wall 319.

In each of the embodiments of the air valve shown in FIGS. 1–13, the spring well and pin slots are formed in the floor of the housing and the spaced apart pins project from the slide bar. The valve of the invention may also be constructed with the spring well and pin slots in the slide bar and the pins projecting from the floor. The functioning of a valve with this alternative construction is essentially the same as that of the valves shown in FIGS. 1–13. At present, the applicants favor the alternative construction because of relative ease of manufacture.

FIGS. 14–20 illustrate an air valve 410 that is like the valve 310 shown in FIGS. 12 and 13 except that it incorporates the alternative positioning of the spring well, pin slots, and pins. Referring to FIGS. 15–20, the valve 410 has a two-part housing 414, 415. The housing 414, 415 forms two cavities 20 each of which has an open upper end 22 and a lower end closed by a floor surface 424. The upper portion 414 of the housing has a lip 426 to facilitate mounting of the valve 410 and sidewalls 418 with pivot pin openings 19 that receive a pivot pin 100. As in the valve 310 shown in FIGS. 12 and 13, the pivot pin 100 pivotably mounts two tilt buttons 66. Each tilt button 66 has a front wall 68 from which a stem 70 projects inwardly and terminates in a control peg 76. A first end of the button body has a convex button 472 formed on the front wall 68. As shown in FIGS. 14–16, the convex button 472 is formed by a plurality of small bumps as opposed to the single larger convex button shown in FIGS. 1 and 2. The opposite second end of the button body has a concave button 74. The button sidewall 78 has pivot pin openings 80 through which the pivot pin 100 extends for pivotably mounting the tilt button 66.

The lower portion 415 of the valve housing forms the floor of the housing 414, 415 and has a divider wall 417 projecting upwardly therefrom to separate the two cavities 20 and help define the slide bar slots in which the slide bars 412 move in response to actuation of the tilt buttons 66. Referring to FIG. 15, the upper portion 414 of the housing 414, 415 has a central divider wall 419 with a lower surface 421. Downwardly facing shoulders 420 extend along opposite lower edges of the housing portion 414 parallel to the divider wall 419. The shoulders 420 and the shoulder formed by the bottom 421 of the wall 419 cooperate with the floor surface 424 to provide the slide bar slots, as described above in connection with FIGS. 12 and 13.

Figure 18:
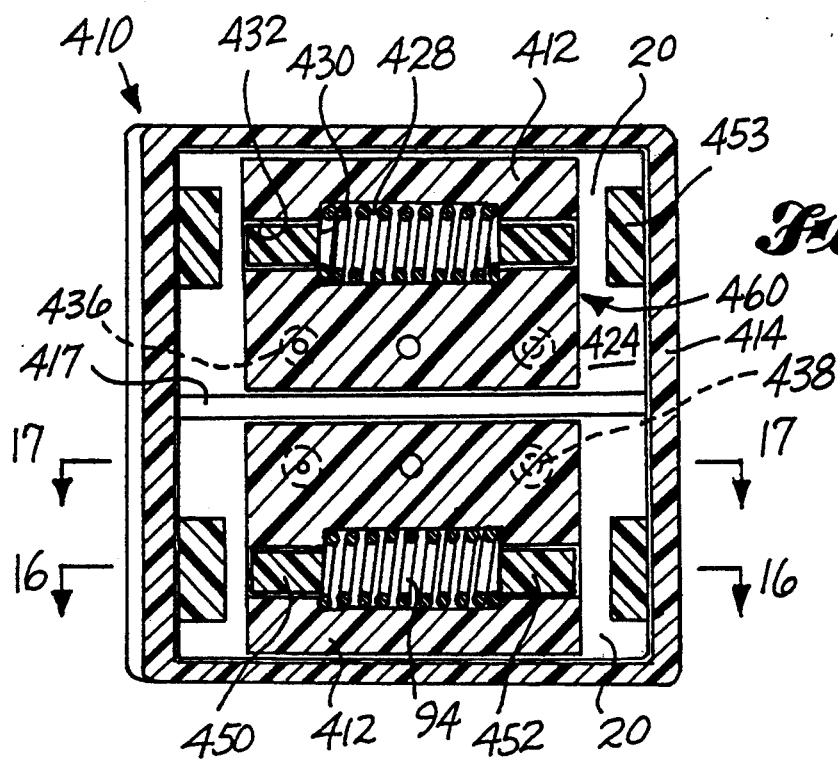
FIG. 18 is a cross-sectional view taken along the line 18—18 in FIG. 16.

Referring to FIGS. 16 and 18, each slide bar 412 has an elongated spring well 428 formed along its inner surface 444. The well 428 includes spring abutments 430 at its opposite ends and pin slots 432 extending endwise beyond the spring abutments 430. A coil spring 94 is received into the spring well 428 with its opposite ends normally abutting the abutments 430.

The floor or lower housing portion 415 has two pairs of spaced apart pins 450, 452 projecting upwardly from the floor surface into the pin slots 432 in the corresponding slide bars 412. As shown in FIGS. 15, 16, and 18, the pins take the form of rectangular projections 450, 452. The floor of each cavity 20 also has formed therein an inlet air port 436 and an outlet air port 438. Apart from its spring well, the outlet air port 438 is formed in the same manner as the outlet air port 38 of the embodiment shown in FIGS. 1–9 and has a standard barb connector 43. The inlet air port 436 is modified to share a single standard snap connector 442 with the inlet air port 436 in the other cavity 20. The two inlet ports 436 have a common outer passageway 436a and separate inner passageways 436b (FIG. 17). Each of the inlet and outlet ports 436, 438 has at its upper end an annular seal ring well 440 into which a seal ring 492 with an elongated axial extent is received. The elongated configuration of the ring 492 helps to increase its resistance to being dislodged as the slide bar 412, which sealingly engages the ring 492, slides between its positions.

As in the other embodiments, the slide bar 412 has an outer surface 446 with a control peg socket 448 formed thereon for engaging the tilt button 66. In the case of the embodiment shown in FIGS. 14–20, the socket 448 is formed between two opposite projections 447. A groove 449 is formed laterally across the outer surface 446 of the slide bar 412 between the projections 447 to help ensure sufficient clearance for the tilt button control peg 76. As the tilt button 66 moves the slide bar 412, movement of the slide bar 412 into each of its end positions is limited by engagement of the side surfaces 460 of the slide bar with projections 453 projecting upwardly from the floor 415 of the housing.

Figure 19:
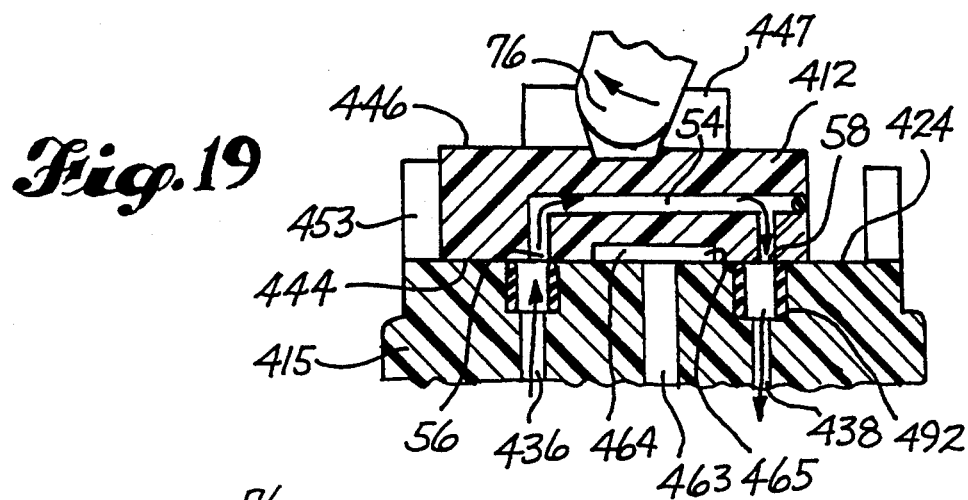
FIG. 19 is like FIG. 17 except additional housing portions are omitted and the slide bar is in a first end position.
Figure 20:
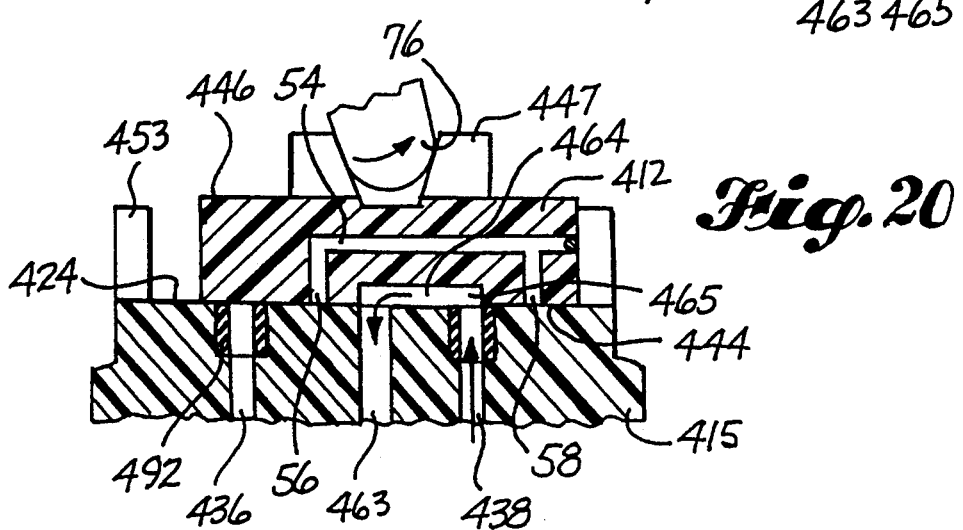
FIG. 20 is like FIG. 19 except it shows the slide bar in an opposite second end position.
Figure 27:
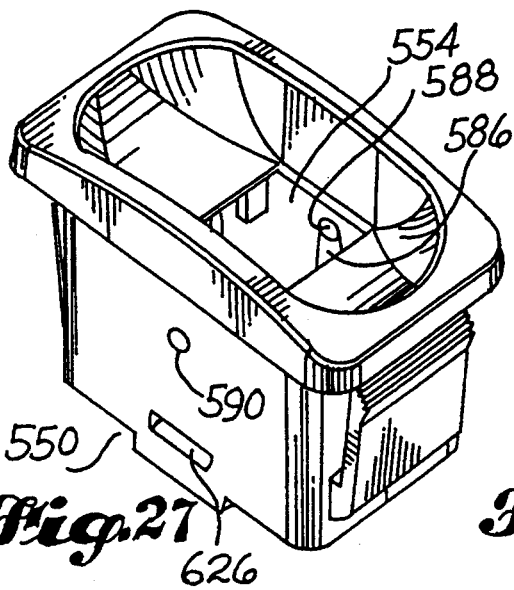
FIG. 27 is a pictorial view of a housing part forming a portion of another embodiment of the invention, such view being taken from above and looking toward one side, one end and the top of the housing part.
Figure 28:
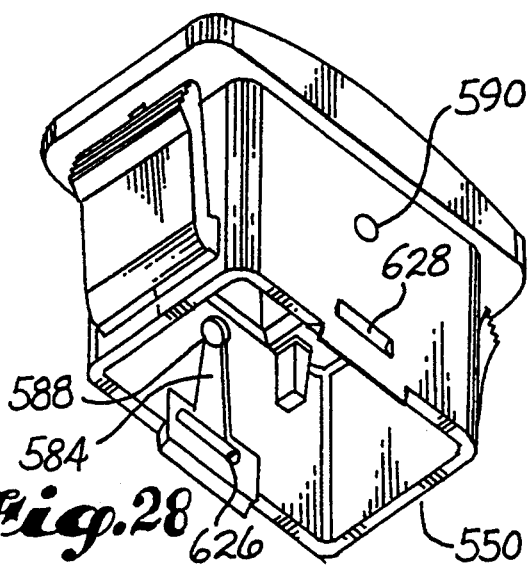
FIG. 28 is another pictorial view of the housing part shown by FIG. 27, such view being taken from below and looking toward the same end, the opposite side and the bottom of the housing part.
Figure 29:
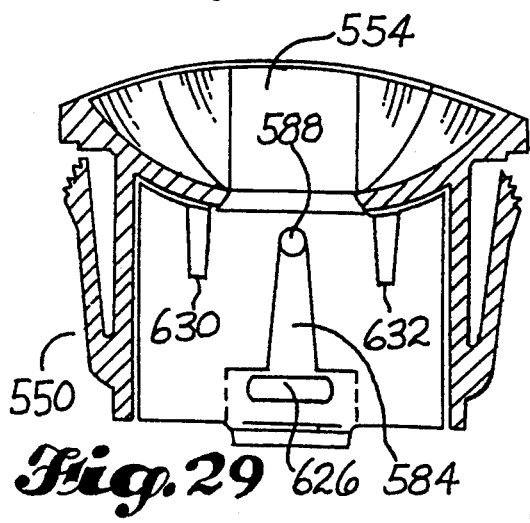
FIG. 29 is a longitudinal sectional view of the housing part shown in FIGS. 27 and 28.
Figure 31:
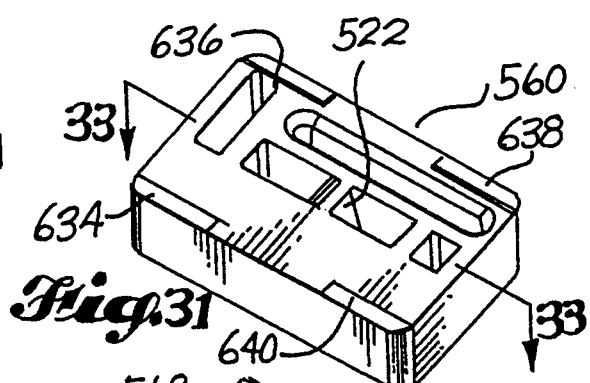
FIG. 31 is an enlarged scale pictorial view of a slide bar for such embodiment, such view being taken from above and looking toward one side, one end and the top of the slide bar.

The slide bar 412 has an internal air passageway 54 with essentially the same construction as the passageway 54 shown in FIGS. 5, 7, and 9. Referring to FIGS. 17, 19, and 20, the passageway 54 includes an inlet portion 56 and an outlet portion 58. In addition to the air passageway 54, the slide bar 412 has a vent passageway 464 that is formed by a slot extending along the inner surface 444 of the slide bar 412. The vent passageway 464 has an inlet end portion 465 and an outlet end portion that communicates with an opening 463 through the floor 415.

As noted above, the valve 410 shown in FIGS. 14–20 operates in substantially the same manner as the valves shown in FIGS. 1–13. Although the spring 94 is located in the slide bar 412 rather than the floor 415, it operates in the same manner to bias the slide bar 412 into the center neutral position shown in FIG. 17 and to permit movement of the slide bar 412 into the fill and vent end positions shown in FIGS. 19 and 20, respectively. Because of the difference in the configuration of the vent passageway 464 and the provision of the floor opening 463, the venting of pressure in the outlet port 438 illustrated in FIG. 20 involves flow from the port 438 through the slot forming the vent passageway 464 and directly out through the floor opening 463 to atmosphere. In this case, no air is vented into the housing cavity 20. Rather, the air is vented behind the valve 410 away from the operator of the tilt button 66.

FIGS. 21–24 illustrate a modification of the valve 410 in which the inlet air port and slide bar passageways are modified to help control pressure in the outlet air port 438. This modification is intended to be used for inflating lumbar supports in heavy truck seats but, of course, may also be used in other applications. Referring to FIGS. 21, 23, and 24, the slide bar 412' in this embodiment has an internal air passageway 54' with an inlet portion 56 and an outlet portion 58. The extension of the passageway 54 and the plug 62 are omitted in FIGS. 21, 23, and 24 in order to simplify the illustration. The passageway 54' includes a bend 59 between the inlet portion 56 and the outlet portion 58. Unlike the passageway 54 of the embodiment shown in FIGS. 14–20, the passageway 54' in the modified embodiment communicates with the vent passageway. The vent passageway 464' includes a slot running along the inner surface of the slide bar 412' and having an inlet end portion 465. The vent passageway 464' also includes a passage 510 that extends between the air passageway 54' and the slot to intercommunicate the air passageway 54' and the vent passageway 464'.

The floor portion 415' of the valve housing shown in FIGS. 21–24 is also modified. The most significant modification is in the inlet port 436'. The outlet port 438 has essentially the same construction, and the floor opening 463' is substantially the same but is generally larger. The inlet port 436' includes a passage 512 and a tapered groove 514. The groove 514 extends along and opens onto the passage 512, tapering toward the inner surface of the slide bar 412' and the inlet portion 56 of the air passageway 54'. The passage 512 has an essentially constant cross section, and is preferably cylindrical, as shown in FIG. 22. A plug 516 is positioned in the passage 512 and, together with the groove 514, defines a metered aperture to control air flow through the inlet air port 436' into the air passageway 54'. The control of the flow into the air passageway 54' in turn controls air pressure in the outlet air port 438. The plug 516 is preferably formed by a spherical ball and is adjustable in position along the passage 512 to permit adjustment of the size of the aperture to adjust the air pressure in the outlet air port 438. The adjustability of the plug 516 allows the pressure in the outlet air port 438 to be finely adjusted, and permits compensation for manufacturing tolerances of the other portions of the valve, while maintaining relative simplicity in the structure of the valve and ease of manufacture.

The valve illustrated in FIGS. 21–24 is preferably operated by means of tilt buttons, such as those shown in FIGS. 1–20. The slide bar 412' is spring biased into the center position shown in FIG. 23 and is moved by the tilt button into the opposite end positions shown in FIGS. 21 and 24. In the center position shown in FIG. 23, both the inlet port 436' and the outlet port 438 are blocked by the slide bar 412'. In the fill position shown in FIG. 21, pressurized air enters inlet port 436' and flows past the plug 516 through the aperture defined by the groove 514 and the plug 516. The air flow then moves up past the seal ring 492 into the inlet portion 56 of the internal air passageway 54'. Flow through the passageway 54' is slowed by the bend 59. In other words, the bend 59 helps to prevent buildup of flow momentum that could result in a higher pressure in the outlet port 438 than is desired. Beyond the bend 59, a portion of the flow through the passageway 54' enters the passage portion 510 of the vent passageway 464'. Flow into the passage 510 is vented to atmosphere via the opening 463' in the valve floor 415'. The portion of the flow in the passageway 54' that is not bled off through the passage 510 continues on through the passageway 54' and exits the valve through the outlet port 438. The combination of the metering of the inlet port 436', the bend 59 in the internal air passageway 54', and the bleeding off of a portion of the flow in the passageway 54' all cooperate to control and limit air pressure in the outlet port 438. This is desirable when the valve controls a lumbar back support since the source of pressurized air commonly has a pressure that is much higher than is desired in the inflatable bag of the support.

FIG. 24 illustrates the opposite end position of the slide bar 412' in which pressure is vented from the outlet air port 438. As in the embodiment shown in FIGS. 14-20, air from the outlet port 438 enters the inlet portion 465 of the vent passageway slot and moves through the slot and down through the floor opening 463' to atmosphere.

FIGS. 25 and 26 show an alternative construction for controlling pressure in the outlet port 438. In this embodiment, the slide bar 412' has the same structure as that shown in FIGS. 21, 23, and 24. The valve floor 415" has an outlet port 438 and a floor opening 463' with the same structure as the embodiment of FIGS. 21-24. The difference between the two embodiments is in the structure of the inlet port 436". The port 436" has a metered aperture that is formed by a disk 522, rather than by the passage/groove configuration discussed above. The circular disk 522 is positioned in the spring well of the port 436" and is held in place by the seal ring 92. The disk 522 has a center aperture 524, which is the metered aperture. The aperture 524, the bend 559, and the bleed passage 510 all operate to control pressure in the outlet port 438 as described above.

Figure 32:
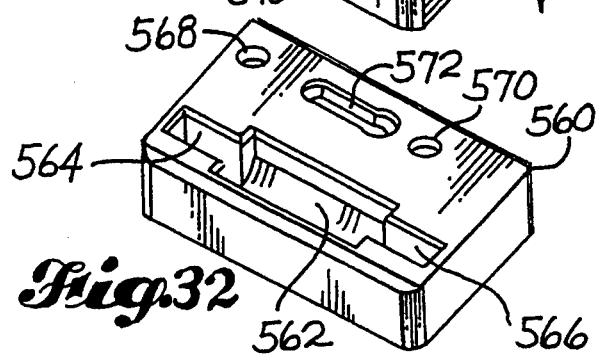
FIG. 32 is a pictorial view of the slide bar looking toward one side, one end and the bottom of the slide bar shown by FIG. 31.
Figure 30:
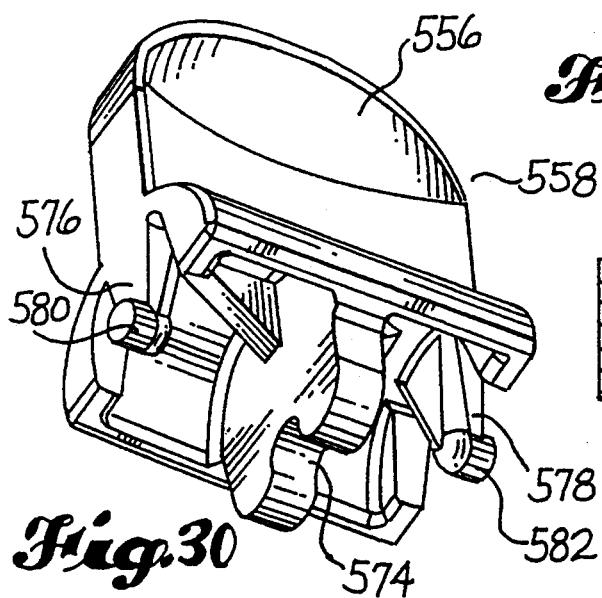
FIG. 30 is an enlarged scale pictorial view of a control button for such embodiment, said view being taken from below and looking toward one end, one side and the bottom of the control button.
Figure 33:
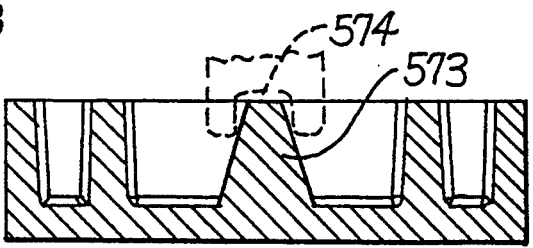
FIG. 33 is a longitudinal sectional view taken through the slide bar of FIG. 31, substantially along line 33—33 of FIG. 31.

FIGS. 27-35 show the major components of another embodiment of the invention. In this embodiment, upper and lower housing parts 550, 552 snap-fit together. The upper housing part 550 includes a top opening 554 up through which the handle 556 of a tilt button 558 projects. The slide bar 560 is much like the previously-described slide bars. Referring to FIG. 32, the spring well is designated 562. The pin cavities are designated 564, 566. The air ports are designated 568, 570. The vent port is designated 572. The upper end of a control pin 573 (FIGS. 31 and 33) engages a slot or notch 574 in a lower central portion of the tilt button 558 (FIGS. 30 and 33). Movement of the handle 556 in one direction swings the slot 574 in the opposite direction. The engagement of pin 573 within slot 574 causes a sliding movement of the slide bar 560. As best shown by FIG. 30, the tilt button 558 includes a pair of leaf spring arms 576, 578, one at each end of the tilt button 558. Arms 576, 578 carry trunnions 580, 582. The sidewalls of housing part 555 includes guide slots 584, 586 for the trunnions. Trunnion receiving openings 588, 590 are located at the upper ends of the slots 584, 586. The trunnion openings 88, 590 are in coaxial alignment.

Figure 34:
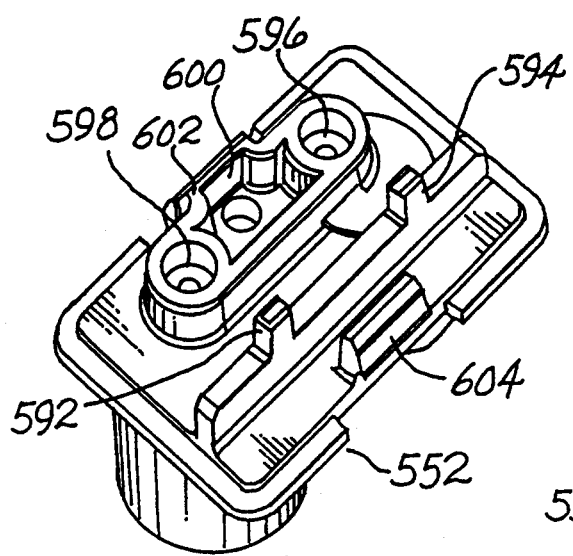
FIG. 34 is a pictorial view of a second housing part adapted to be connected to the housing part shown by FIGS. 27-29, such view being taken from above and looking toward one end, one side and the top of the housing part.
Figure 35:
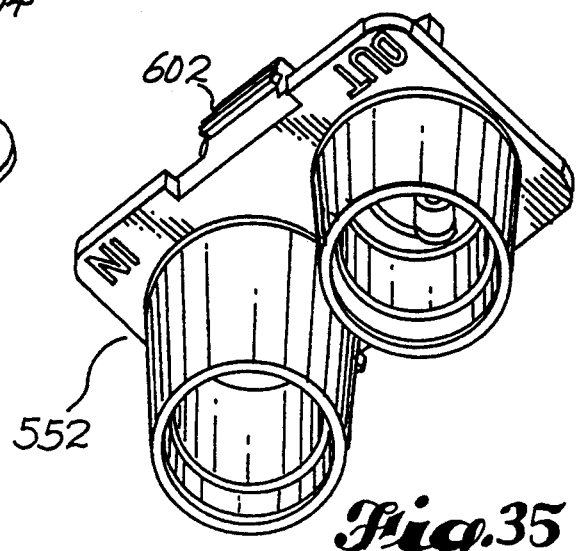
FIG. 35 is a pictorial view of the housing part shown by FIG. 34, taken from below and looking toward one side, one end and the bottom of the housing part.
Figure 36:
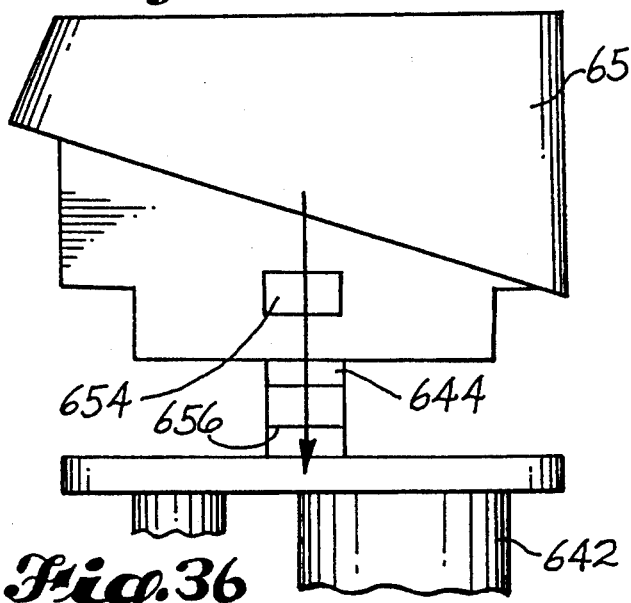
FIG. 36 is an exploded elevational view of the two housing parts, with some portions fragmented and others omitted.
Figure 37:
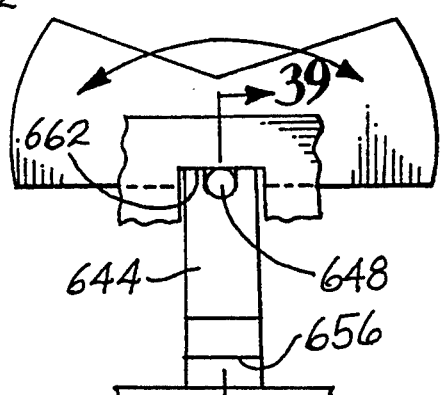
FIG. 37 is a fragmentary side view of portions of the two housing parts and a control button, such view showing a trunnion on one side of the control button being supported within a slot at the upper end of a support member, and an upper housing portion positioned to close the slot and hold the trunnion within the slot.

Referring to FIG. 34, the spring pins are designated 592, 594. The spring (not shown) is placed within the spring well 562. Then the slide bar 560 is lowered to place the air ports 568, 570 and the vent port 572 in alignment with the passageways 596, 598, 600, and place the pins 592, 594 within the pin cavities 564, 566. The tilt button 558 is inserted into the upper housing 550 through the lower end opening. Handle 556 is moved through top opening 554. Trunnions 580, 582 are moved upwardly along slots 584,586. The arms 576,578 are bent inwardly by the contact of the trunnions with the slots when the trunnions 580, 582 reach alignment with the trunnion openings 588, 590. The arms 576, 578 straighten and move outwardly and the trunnions 580, 582 snap-fit into the trunnion openings 588, 590. Then, the upper housing 550 is moved downwardly onto the lower housing 552. Slot 564 is moved into engagement with pin 573, as shown in FIG. 33. Then the two housing parts are moved together causing detents 602,604 to snap-fit into slots 626, 628. When the housing parts 550, 552 are together, the lower ends of four ribs 630, 632, contact corner regions 634, 636, 638, 640 of the slide bar 560. This contact holds the slide bar 560 into contact with O-ring seals at the ports, such as shown by FIGS. 19-25, for example.

Figure 38:
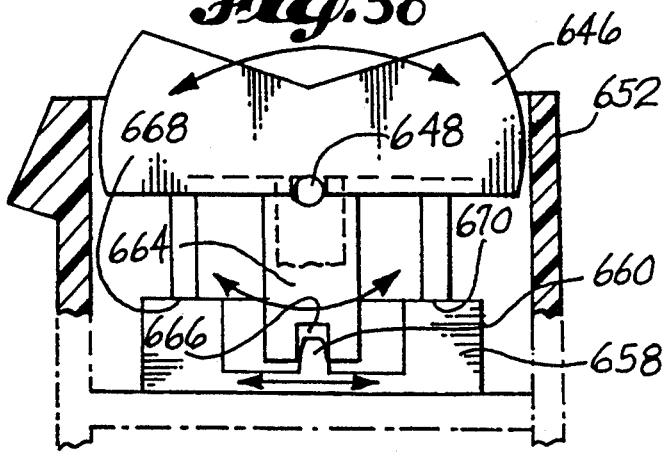
FIG. 38 is a fragmentary side elevational view of such additional embodiment, with some parts shown in section, other parts shown in phantom line and other parts omitted.
Figure 39:
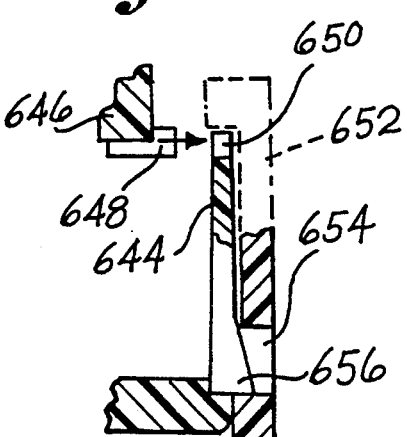
FIG. 39 is a fragmentary sectional view taken substantially along line 39—39 of FIG. 37, with some parts shown in side elevation, some shown in phantom line, and with a portion of the tilt button and a trunnion on the tilt button being shown spaced from the slot cradle on top of the support member.

FIGS. 36-39 show a modified construction of a two-part, snap-together housing for a two button embodiment, such as shown by FIGS. 14-20, for example. The lower housing part 642 includes four upwardly projecting tilt button support members. Only one of the support members is illustrated and it is designated 642. There is a separate support member for each side of each tilt button. One tilt button is illustrated and it is designated 646. Each tilt button has a pair of trunnions, one at each of its sides. One trunnion is illustrated and it is designated 648. A notch is formed at the upper end of each support member 644. One notch is illustrated and it is designated 650. Each notch forms a cradle for a trunnion. FIG. 39 shows trunnion 648 in a spaced relationship to notch 650.

In this embodiment, the upper housing part 652 includes a window at each of its sides. One window is illustrated and it is designated 652. Each window is sized to receive a lug on a support member. One lug 656 is illustrated and it is on support member 644. The slide bars 658 are positioned on the top of the lower housing member 642. Each slide bar 658 is basically like the slide bars that have been previously described. Each includes a spring well, pin cavities, air ports and a vent port. In this embodiment, each slide bar 658 includes a control pin on each of its sides. In FIG. 38, one control pin is illustrated and it is designated 660. The tilt buttons 646 are positioned on the support members with the trunnions within the cradles. Then, the upper housing member 562 is moved downwardly around the tilt buttons and onto the lower housing member 642. Downward movement of upper housing part 652 eventually results in the lock lugs being moved into registry with the windows. FIG. 39 shows lock lug 656 snap-fitted into window 654. When the housing parts 652, 642 are assembled, inner shoulder surfaces of housing part 652 fit down onto the upper ends of the support members 644. One of these surfaces is designated 662 in FIG. 37.

Surface 662 forms a top closure for recess 650 and holds trunnion 648 within recess 650. The same thing happens at the other recesses and trunnions. Tilt button 646 includes a downwardly projecting arm 664 which includes a slot 666 at its lower end. Slot 666 engages control pin 660. There are four arms, two on each tilt button. Each arm has a slot at its lower end which engages a separate control pin on its slide bar. When the housing parts are assembled, the lower ends of inner sidewall ribs contact the upper surfaces of the slide bars. In FIG. 38 two ribs are shown. Their lower ends are designated 668, 670. These ends contact slide bar 658. This contact holds the slide bars into tight engagement with the O-ring seals, in the same manner as described above in connection with the embodiment shown in FIGS. 27–35.

It is anticipated that the air valve of the invention will be used primarily for inflating inflatables in the seats in the cabs of trucks. For example, an inflatable may be installed in the bottom of a seat to allow the hardness of the seat to be adjusted by introducing air into the inflatable or venting air from the inflatable. In addition, an inflatable may be supplied in the lumbar support area of a seat to permit adjustment of the degree of support by supplying air to the inflatable or venting air from the inflatable. In a preferred form of the invention, the tandem air valve 310 illustrated in FIG. 12 is provided for controlling both the bottom and lumbar support regions of a seat. The valve 310 may be mounted on the dashboard or seat side panel of the truck within easy reach of the driver.

Although the preferred embodiments of the invention have been illustrated and described herein, it is intended to be understood by those skilled in the art that various modifications and omissions in form and detail may be made without departing from the spirit and scope of the invention as defined by the following claims.

What is claimed is:

1. In an air valve which includes a slide bar support with a support surface, and at least one air port in said support which breaks said surface, a slide bar system for controlling air flow through said air port, comprising:
    a slide bar supported on said support surface and including an internal air passageway having an inlet portion;
    an elongated spring well in one of said slide bar and said slide bar support; said spring well having a spring abutment at each end, and a pin slot at each end extending endwise beyond the spring abutment;
    a coil spring within said spring well having first and second ends which are normally against said abutments; and
    a pair of spaced apart pins projecting from the other of said slide bar and said slide bar support into the pin slots; said pins normally being at least substantially contiguous to the ends of the spring when the spring is in a center position with its ends against the spring abutments;
    said spring and pins normally biasing the slide bar in a center position;
    said spring, said pins, and said pin slots permitting movement of the slide bar endwise against the spring into an end position;
    wherein when the slide bar is in its center position, the air port in the slide bar support is blocked by the slide bar and the inlet portion of the air passageway in the slide bar is blocked by the support; and
    wherein when the slide bar is in its end position, the air port in the slide bar support is in communication with the inlet portion of the air passageway in the slide bar.

2. A slide bar system according to claim 1, wherein the slide bar support includes an annular seal ring well surrounding the air port, and the system includes a seal ring in said well presenting an annular seal surface toward the slide bar.

3. A slide bar system according to claim 1, wherein said slide bar support includes a second air port which breaks said support surface, and said internal air passageway includes an outlet portion; wherein when said slide bar is in its center position, the second air port in the slide bar support is blocked by the slide bar and the outlet portion of the air passageway in the slide bar is blocked by the support; and wherein when the slide bar is in its end position, the second air port in the slide bar support is in communication with the outlet portion of the air passageway in the slide bar.

4. A slide bar system according to claim 3, wherein the slide bar support includes an annular seal ring well surrounding each of said air ports, and the system includes a seal ring in each said well presenting an annular seal surface toward the slide bar.

5. A slide bar system according to claim 3, wherein the slide bar includes a vent passageway having an inlet end portion; wherein when the slide bar is in its center position, said inlet end portion of the vent passageway of the slide bar is blocked by the support; and wherein when the slide bar is in an opposite end position, the second air port in the slide bar support is in communication with said inlet end portion of the vent passageway in the slide bar.

6. A slide bar system according to claim 5, wherein the slide bar support includes an annular seal ring well surrounding each of said air ports, and the system includes a seal ring in each said well presenting an annular seal surface toward the slide bar.

7. A slide bar system according to claim 3, wherein said air port that is in communication with the inlet portion of the air passageway in the slide bar when the slide bar is in its end position is an inlet port and includes a metered aperture to control air flow through said inlet port into said air passageway, and said air passageway includes a bend between said inlet portion and said outlet portion to slow air flow through said air passageway and cooperate with said aperture to control air pressure in said second air port.

8. A slide bar system according to claim 7, wherein said inlet port comprises a passage with an essentially constant cross section, and a tapered groove extending along and opening onto said passage and tapering toward said support surface; and said system includes a plug positioned in said passage, said plug and said groove together forming said aperture, and said plug being adjustable in position along said passage to permit adjustment of the size of said aperture.

9. A slide bar system according to claim 8, wherein the slide bar includes a vent passageway having an outlet end portion, and an inlet end portion that is blocked by said support when the slide bar is in its center position and that is in communication with said second air port when the slide bar is in an opposite end position to vent air from said second air port; said vent passageway communicating with said air passageway to bleed off a portion of air flow through said air passageway from said inlet port and thereby help control pressure in said second air port.

10. A slide bar system according to claim 7, wherein the slide bar includes a vent passageway having an outlet end portion, and an inlet end portion that is blocked by said support when the slide bar is in its center position and that is in communication with said second air port when the slide bar is in an opposite end position to vent air from said second air port; said vent passageway communicating with said air passageway to bleed off a portion of air flow through said air passageway from said inlet port and thereby help control pressure in said second air port.

11. A slide bar system according to claim 10, wherein said vent passageway comprises a slot extending along a surface of the slide bar adjacent to said support, and a passageway extending between and communicating said slot and said air passageway; said slot including an inlet end portion that is blocked by said support when the slide bar is in its center position and is in communication with said second air port when the slide bar is in an opposite end position to vent air from said second air port.

12. A slide bar system according to claim 1, wherein the slide bar support includes a second air port which breaks said support surface, and the slide bar includes a vent passageway having an inlet end portion; wherein when the slide bar is in its center position, the second air port in the slide bar support is blocked by the slide bar and said inlet end portion of the vent passageway in the slide bar is blocked by the support; and wherein when the slide bar is in a second end position, the second air port in the slide bar support is in communication with said inlet end portion of the vent passageway in the slide bar.

13. A slide bar system according to claim 12, wherein the slide bar support includes an annular seal ring well surrounding each of said air ports, and the system includes a seal ring in each said well presenting an annular seal surface toward the slide bar.

14. An air valve, comprising:
a housing having a floor and a sidewall together forming a cavity having a open outer end and an inner end closed by said floor; said floor including a floor surface, an inlet air port, and an outlet air port spaced from the inlet air port; said inlet air port and outlet air port breaking said floor surface;
a slide bar supported on said floor in said cavity and having an inner surface adjacent to the floor surface, an outer surface, and an internal air passageway including an inlet portion breaking the inner surface and an outlet portion breaking the inner surface; said slide bar including a vent passageway having a first end that breaks the inner surface of the slide bar and a second end; and said slide bar also including outwardly facing control portions;
an elongated spring well in one of said floor and said slide bar; said spring well having a spring abutment at each end, and a pin slot at each end of said spring well extending endwise beyond the spring abutment at that end;
a pair of spaced apart pins projecting from the other of said floor and said slide bar and normally situated within said pin slots;
a coil spring located in the spring well, said spring having first and second ends, said pins normally being at least substantially contiguous to the ends of the spring, and said spring and pins normally biasing the slide bar in a center position; and said spring, said pins, and said pin slots permitting movement of the slide bar endwise against the spring into a first end position and endwise against the spring into an opposite second end position; and
a tilt button for moving the slide bar; said tilt button including first and second outer end portions adjacent the outer end of the cavity, and a button body at least partially within said cavity; said body having a stem projecting inwardly into said cavity and including control portions at its inner end which engage said control portions of the slide bar;
said tilt button being mounted on opposite portions of the housing sidewall for pivotal movement in two directions,
whereby a push on the first outer end portion of the tilt button will tilt said tilt button in position and swing the stem in position, to exert an endwise force on the slide bar, moving the slide bar from the center position to the first end position; and a push on the second outer end portion of the tilt button will cause the tilt button to tilt in position in the opposite direction, and swing the stem in position in the opposite direction, to exert an endwise force on the slide bar in the opposite direction, moving the slide bar from the center position to the second end position;
wherein when the slide bar is in the center position, both the inlet air port and the outlet air port in the floor of the housing are blocked by the slide bar,
wherein when the slide bar is in its first end position, the inlet portion of the air passageway in the slide bar is in communication with the inlet air port in the floor of the housing and the outlet portion of the air passageway in the slide bar is in communication with the outlet air port in the floor of the housing, thereby allowing air to flow from the inlet air port, through the air passageway, to and through the outlet air port; and
wherein when the slide bar is in its second end position, the inlet air port in the floor of the housing is blocked by the slide bar and the vent passageway in the slide bar is in communication with the outlet air port in the floor of the housing, thereby allowing air to flow from the outlet air port through the vent passageway to the atmosphere.

15. An air valve according to claim 14, wherein said coil spring is substantially cylindrical and has a diameter, and the spring well has a width corresponding to the diameter of the coil spring; wherein the pin slots are narrower than the width of the spring well, and shoulder portions of the spring well extend laterally outwardly of the pin slots and form the spring abutments; and wherein said spaced apart pins engage central portions of transverse end surfaces of the coil spring which are in alignment with the pin slots.

16. An air valve according to claim 14, wherein the floor of the housing includes an annular seal ring well surrounding the inlet air port and another annular seal ring well surrounding the outlet air port, and a seal ring is located in each seal ring well, each seal ring presenting an annular seal surface toward the slide bar.

17. An air valve according to claim 16, further comprising means for exerting a force on said outer surface of said slide bar to urge said inner surface of said slide bar against said seal rings and prevent tilting of said slide bar relative to said floor surface.

18. An air valve according to claim 16, wherein the housing sidewall has opposite shoulders formed thereon that, together with said floor surface, form a slide bar slot for receiving edge portions of the slide bar; and wherein said shoulders contact said outer surface of the slide bar along said edge portions to urge said inner surface of the slide bar against said seal rings and prevent tilting of the slide bar relative to said floor surface.

19. The air valve of claim 16, wherein the housing includes a lower portion that forms said floor, and an upper portion; said tilt button includes a pair of trunnions that are captured between wall portions of said upper and lower portions of said housing, when said upper and lower portions of said housing are moved together during assembly of the valve, to pivotably mount said tilt button; and the upper portion of said housing has shoulders formed thereon that contact said outer surface of the slide bar to urge said inner surface of the slide bar against said seal ring and prevent tilting of the slide bar relative to said floor surface.

20. An air valve according to claim 14, further comprising means for exerting a force on said outer surface of said slide bar to urge said inner surface of said slide bar toward said floor surface and prevent tilting of said slide bar relative to said floor surface.

21. An air valve according to claim 14, wherein the housing sidewall has opposite shoulders formed thereon that, together with said floor surface, form a slide bar slot for receiving edge portions of the slide bar; and wherein said shoulders contact said outer surface of the slide bar along said edge portions to urge said inner surface of the slide bar toward said floor surface and prevent tilting of the slide bar relative to said floor surface.

22. An air valve according to claim 14, further including a stabilizer frame positioned between the slide bar and the tilt button; said stabilizer frame having an open center through which the tilt button stem extends, and a bottom surface; wherein said bottom surface contacts the outer surface of the slide bar to urge the inner surface of the slide bar toward said floor surface of said housing and prevent tilting of the slide bar relative to said floor surface.

23. An air valve according to claim 22, wherein said stabilizer frame has resilient edge portions, and said sidewall of said housing has recesses opening into said cavity; and wherein said edge portions of said stabilizer frame are received in said recesses of said sidewall such that said stabilizer frame is snap-fit into said cavity of said housing.

24. An air valve according to claim 23, wherein the floor of the housing includes an annular seal ring well surrounding the inlet air port and another annular seal ring well surrounding the outlet air port, and a seal ring is located in each seal ring well, each seal ring presenting an annular seal surface toward the slide bar; and wherein said stabilizer frame urges the inner surface of the slide bar against said seal rings.

25. An air valve according to claim 22, wherein the floor of the housing includes an annular seal ring well surrounding the inlet air port and another annular seal ring well surrounding the outlet air port, and a seal ring is located in each seal ring well, each seal ring presenting an annular seal surface toward the slide bar; and wherein said stabilizer frame urges the inner surface of the slide bar against said seal rings.

26. An air valve according to claim 14, further including a second slide bar, a second spring, a second tilt button, a second spring well having a spring abutment at each end, a second pin slot at each end of the second spring well extending endwise beyond the spring abutment at that end, and a second pair of spaced apart pins projecting into said second pin slots; wherein said floor of said housing includes a second inlet air port, and a second outlet air port spaced from the second inlet air port; said second spring being received in said second spring well, and said second tilt button being positioned to move said second slide bar; and wherein each said slide bar is independently operable to control its respective inlet and outlet air ports.

27. The air valve of claim 14, wherein said housing includes a lower portion that forms said floor, and an upper portion; said tilt button includes a pair of trunnions that are captured between wall portions of said upper and lower portions of said housing, when said upper and lower portions of said housing are moved together during assembly of the valve, to pivotably mount said tilt button; and the upper portion of said housing has shoulders formed thereon that contact said outer surface of the slide bar to urge said inner surface of the slide bar toward said floor surface and prevent tilting of the slide bar relative to said floor surface.

* * * * *